US011280669B2

(12) United States Patent
Gorman et al.

(10) Patent No.: US 11,280,669 B2
(45) Date of Patent: Mar. 22, 2022

(54) PULSED LASER INTERFEROMETER AND MEASURING VIBRATIONAL AMPLITUDE AND VIBRATIONAL PHASE

(71) Applicant: Government of the United States of America, as represented by the Secretary of Commerce, Gaithersburg, MD (US)

(72) Inventors: Jason John Gorman, Silver Spring, MD (US); Lei Shao, Clarksburg, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 87 days.

(21) Appl. No.: 16/876,728

(22) Filed: May 18, 2020

(65) Prior Publication Data

US 2020/0386611 A1   Dec. 10, 2020

Related U.S. Application Data

(60) Provisional application No. 62/858,060, filed on Jun. 6, 2019.

(51) Int. Cl.
*G01H 9/00*        (2006.01)
(52) U.S. Cl.
CPC .................................. *G01H 9/008* (2013.01)

(58) Field of Classification Search
CPC ........ G01B 11/06; G01N 21/45; G01N 21/17; G01D 5/26; G01J 11/00; G01J 2009/02; G01H 9/00
See application file for complete search history.

(56) References Cited

U.S. PATENT DOCUMENTS

| | | | |
|---|---|---|---|
| 5,706,094 A * | 1/1998 | Maris ................. | G01N 21/1717 356/432 |
| 6,008,906 A * | 12/1999 | Maris ................. | G01N 21/1717 250/226 |
| 6,552,799 B1 | 4/2003 | Wright et al. | |
| 6,552,800 B1 | 4/2003 | Wright et al. | |
| 7,940,400 B2 * | 5/2011 | Lopushansky ..... | G01B 9/02023 356/519 |

(Continued)

*Primary Examiner* — Mohamed K Amara
(74) *Attorney, Agent, or Firm* — Office of Chief Counsel for National Institute of Standards and Technology

(57) ABSTRACT

A pulsed laser interferometer includes: a pulsed laser; a vibration controller that produces a vibration control signal that controls a vibrational frequency and vibrational amplitude of a structural member; an interferometer controller; a pathlength control stage that changes an optical pathlength for laser pulses; a pathlength reflector that moves in concert with the pathlength control stage to change the optical pathlength of propagation for the laser pulses; a light pulse detector that produces a light pulse detector signal; an interference light detector that produces an interference frequency signal; a signal mixer that produces a reference frequency signal; and a phase-sensitive detector that produces a vibrational amplitude signal and a vibrational phase signal from the interference frequency signal referenced to the reference frequency signal.

14 Claims, 18 Drawing Sheets

(56) References Cited

U.S. PATENT DOCUMENTS

| | | | | |
|---|---|---|---|---|
| 8,115,937 | B2* | 2/2012 | Needham | G01B 9/0209 |
| | | | | 356/506 |
| 10,033,149 | B2* | 7/2018 | Schiffrin | H01L 31/0328 |
| 10,942,116 | B2* | 3/2021 | Prater | G01N 21/35 |
| 10,955,335 | B2* | 3/2021 | Pelivanov | G01N 21/1702 |
| 2008/0165355 | A1* | 7/2008 | Yasui | G01N 21/3586 |
| | | | | 356/323 |
| 2011/0069309 | A1* | 3/2011 | Newbury | G01J 3/453 |
| | | | | 356/326 |
| 2011/0304854 | A1* | 12/2011 | Li | G01B 9/02007 |
| | | | | 356/496 |
| 2012/0204296 | A1* | 8/2012 | Prater | B82Y 35/00 |
| | | | | 850/6 |
| 2014/0114187 | A1* | 4/2014 | Rozental | A61B 8/44 |
| | | | | 600/437 |
| 2015/0253645 | A1* | 9/2015 | Coddington | H01S 3/0092 |
| | | | | 359/328 |
| 2017/0329043 | A1* | 11/2017 | Bhongale | E21B 49/008 |
| 2018/0306716 | A1* | 10/2018 | Ashrafi | G01N 21/636 |
| 2021/0052164 | A1* | 2/2021 | Shnaiderman | A61B 5/7257 |

\* cited by examiner (A)

(B)

PULSED LASER INTERFEROMETER AND MEASURING VIBRATIONAL AMPLITUDE AND VIBRATIONAL PHASE

CROSS REFERENCE TO RELATED APPLICATIONS

The application claims priority to U.S. Provisional Patent Application Ser. No. 62/858,060 filed Jun. 6, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Agreement No. 70NANB14H320 and 70NANB16H132 awarded by the National Institute of Standards and Technology. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 19-038US1.

BRIEF DESCRIPTION

Disclosed is a pulsed laser interferometer for measuring vibrational amplitude and vibrational phase of a structural member, the pulsed laser interferometer comprising: a pulsed laser in optical communication with the structural member and that: produces a plurality of laser pulses comprises at a fixed pulse repetition rate; and subjects the structural member to the laser pulses that are asynchronous to the vibrations of the structural member; a vibration controller in electrical communication with the structural member and that produces a vibration control signal that controls a vibrational frequency and vibrational amplitude of the structural member; an interferometer controller that receives an interference frequency signal and produces an interferometer control signal based on the interference frequency signal; a pathlength control stage in electrical communication with the interferometer controller and that receives the interferometer control signal from the interferometer controller and moves in a motion as controlled by the interferometer control signal to change an optical pathlength of propagation for the laser pulses in the pulsed laser interferometer; a pathlength reflector disposed on the pathlength control stage and in optical communication with the pulsed laser and that: receives the laser pulses from the laser; and moves in concert with the pathlength control stage to change the optical pathlength of propagation for the laser pulses; a light pulse detector in optical communication with the pulsed laser and that: receives the laser pulses from the pulsed laser; and produces a light pulse detector signal from the laser pulses that is a radiofrequency comb with a fundamental frequency equal to the laser pulse repetition rate; an interference light detector in optical communication with the pathlength reflector and the structural member and that: receives the laser pulses reflected from the structural member; receives the laser pulses reflected from the pathlength reflector; and produces an interference frequency signal from a beat frequency produced from interferences between the laser pulses reflected from the structural member and the laser pulses reflected from the pathlength reflector; a signal mixer in electrical communication with the vibration controller and the light pulse detector and that: receives the light pulse detector signal from the light pulse detector; receives the vibration control signal from the vibration controller; and produces a reference frequency signal from a combination of the vibration control signal and the light pulse detector signal; and a phase-sensitive detector that: receives the reference frequency signal from the signal mixer; receives the interference frequency signal from the interference light detector; references the interference frequency signal from the reference frequency signal; and produces a vibrational amplitude signal and a vibrational phase signal from the interference frequency signal referenced to the reference frequency signal.

Disclosed is a process for measuring vibrational amplitude and vibrational phase of a structural member with a pulsed laser interferometer, the process comprising: producing, by the pulsed laser, the laser pulses; subjecting the structural member to a plurality of laser pulses that are asynchronous to the vibrations of the structural member; producing, by the vibration controller, the vibration control signal; controlling, by the vibration control signal, the vibrational frequency and the vibrational amplitude of the structural member; receiving, by the interferometer controller, the interference frequency signal; producing, by the interferometer controller, the interferometer control signal based on the interference frequency signal; receiving, by the pathlength control stage, the interferometer control signal from the interferometer controller; moving the pathlength control stage in the motion controlled by the interferometer control signal; changing, by the pathlength control stage, the optical pathlength of propagation for the laser pulses in the pulsed laser interferometer; receiving, by the pathlength reflector, the laser pulses; moving the pathlength reflector in concert with the pathlength control stage to change the optical pathlength of propagation for the laser pulses; receiving, by the light pulse detector, the laser pulses from the pulsed laser; producing, by the light pulse detector, the light pulse detector signal that includes the radiofrequency comb with a fundamental frequency set by the pulse repetition rate; receiving, by the interference light detector, the laser pulses reflected from the structural member and the laser pulses reflected from the pathlength reflector; producing, by the interference light detector, the interference frequency signal from the beat frequency produced from interference between the laser pulses reflected from the structural member and the laser pulses reflected from the pathlength reflector; receiving, by the signal mixer, the light pulse detector signal from the light pulse detector; receiving, by the signal mixer, the vibration control signal from the vibration controller; producing, by the signal mixer, the reference frequency signal from the combination of the vibration control signal and the light pulse detector signal; receiving, by the phase-sensitive detector, the reference frequency signal from the signal mixer; receiving, by the phase-sensitive detector, the interference frequency signal from the interference light detector; referencing, by the phase-sensitive detector, the interference frequency signal from the reference frequency signal; and producing, by the phase-sensitive detector, the vibrational amplitude signal and the vibrational phase signal from the interference frequency signal referenced to the reference frequency signal.

BRIEF DESCRIPTION OF THE DRAWINGS

The following description should not be considered limiting in any way. With reference to the accompanying drawings, like elements are numbered alike.

DETAILED DESCRIPTION

Figure 1:
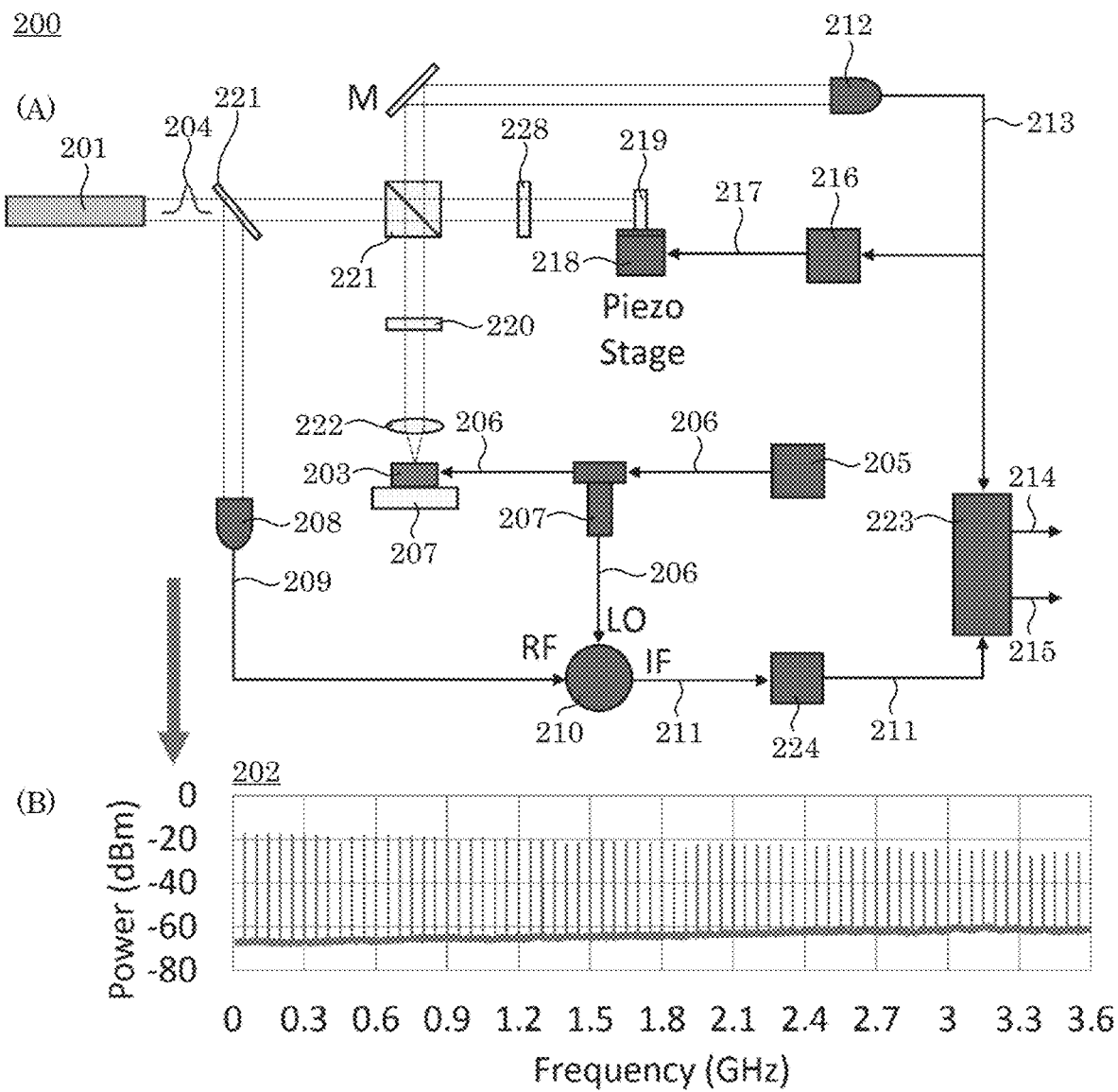
FIG. 1 shows a pulsed laser interferometer in panel A and a radiofrequency comb in panel B for a power spectrum of laser pulse train measured with a 12.5 GHz fast photodetector that shows individual teeth spaced by a pulse repetition rate (50.00 MHz)

A detailed description of one or more embodiments is presented herein by way of exemplification and not limitation.

Conventional vibration measurement in micro- and nanomechanical structures involves Michelson interferometry, including the use of laser Doppler vibrometry. A conventional Doppler vibrometer includes a heterodyne Michelson interferometer with a continuous wave (CW) laser and a photodetector that has at least the same bandwidth as the vibration frequency that is being measured. Accordingly, the photodetector is a gigahertz detector for gigahertz vibrations, and the conventional device has demodulation electronics with this bandwidth, wherein the photodetector and demodulation electronics noise increase as the operational frequency increases, making it difficult to measure small vibrations at high frequencies.

A pulsed laser interferometer converts a high frequency vibration into a low frequency signal. This low frequency signal is measured with a low frequency photodetector, resulting in a significant drop in the noise floor of the measurement as compared with a conventional Doppler vibrometer, wherein the pulsed laser interferometer has a noise floor that is five times lower than a conventional CW heterodyne interferometer at gigahertz frequencies. The low noise floor provided by the pulsed laser interferometer is advantageous since vibration amplitudes decrease for increasing frequency.

The pulsed laser interferometer includes a pulsed laser to transform high frequency (GHz) vibrations into a low frequency (MHz) optical signal measured with a low noise photodetector and provides a noise floor that is 5 times lower than conventional approaches such as continuous wave heterodyne interferometry. Additionally, the pulsed laser interferometer maps resonance frequencies and spatial mode shapes with diffraction-limited resolution, so that modal features as small as approximately 1 micrometer can be resolved. The pulsed laser interferometer can be used in cavity optomechanics, mobile communications, and other applications that involve high frequency mechanical resonators. Moreover, the pulsed laser interferometer provides laser interferometry with a pulsed laser and measures vibrations and traveling acoustic waves that can be as small as tens of femtometers in amplitude and greater than 10 GHz in frequency. The pulsed laser interferometer tunes the repetition rate of the pulses of the probe laser relative to the measured vibrations so that driven vibrations of a micro- or nanomechanical structure are at a frequency that is near, but not equal to, an integer multiple of the laser pulse repetition rate. Vibrations are observed by locking to a beat note between the radiofrequency comb generated by the laser pulses and the drive signal of the micro- or nanomechanical structure. Detection by phase locking that is linked to the RF frequency comb found in the laser pulses provides a stable measurement. An optical interference signal results from optical mixdown of the gigahertz vibrational frequency of the micro- or nanomechanical structure and provides a measurement that is orders of magnitude lower in frequency than the actual vibrations. As a result, problems in measuring vibrations at gigahertz frequencies with conventional devices that use gigahertz detectors with higher noise, insertion loss, and electromagnetic interference at microwave frequencies are avoided and overcome with the pulsed laser interferometer.

It has been discovered that pulsed laser interferometer 200 measures a vibrational amplitude and vibrational phase of structural member 203. In an embodiment with reference to FIG. 1, pulsed laser interferometer 200 includes: pulsed laser 201 in optical communication with structural member 203 and that: produces laser pulses 204, a plurality of laser pulses 204 include a radiofrequency comb 202; and subjects structural member 203 to radiofrequency comb 202 in laser pulses 204; vibration controller 205 in electrical communication with structural member 203 and that produces vibration control signal 206 that controls vibrational frequency and vibrational amplitude of structural member 203; interferometer controller 216 that receives interference frequency signal 213 and produces interferometer control signal 217 based on interference frequency signal 213; pathlength control stage 218 in electrical communication with interferometer controller 216 and that receives interferometer control signal 217 from interferometer controller 216 and moves in a motion as controlled by interferometer control signal 217 to change an optical pathlength of propagation for laser pulses 204 in pulsed laser interferometer 200; pathlength reflector 219 disposed on pathlength control stage 218 and in optical communication with pulsed laser 201 and that: receives laser pulses 204 from laser 201; and moves in concert with pathlength control stage 218 to change the optical pathlength of propagation for laser pulses 204; light pulse detector 208 in optical communication with pulsed laser 201 and that: receives laser pulses 204 from pulsed laser 201; and produces light pulse detector signal 209 with radiofrequency comb from laser pulses 204; interference light detector 212 in optical communication with pathlength reflector 219 and structural member 203 and that: receives laser pulses 204 reflected from structural member 203; receives laser pulses 204 reflected from pathlength reflector 219; and produces interference frequency signal 213 from a beat frequency produced from interferences between laser pulses 204 reflected from structural member 203 and laser pulses 204 reflected from pathlength reflector 219; signal mixer 210 in electrical communication with vibration controller 205 and light pulse detector 208 and that: receives light pulse detector signal 209 from light pulse detector 208; receives vibration control signal 206 from vibration controller 205; and produces reference frequency signal 211 from a combination of vibration control signal 206 and light pulse detector signal 209; and phase-sensitive detector 223 in electrical communication with signal mixer 210 and light pulse detector 208 and that: receives reference frequency signal 211 from signal mixer 210; receives interference frequency signal 213 from interference light detector 212; references interference frequency signal 213 from reference frequency signal 211; and produces vibrational amplitude signal 214 and vibrational phase signal 215 from interference frequency signal 213 referenced to reference frequency signal 211.

Figure 7:
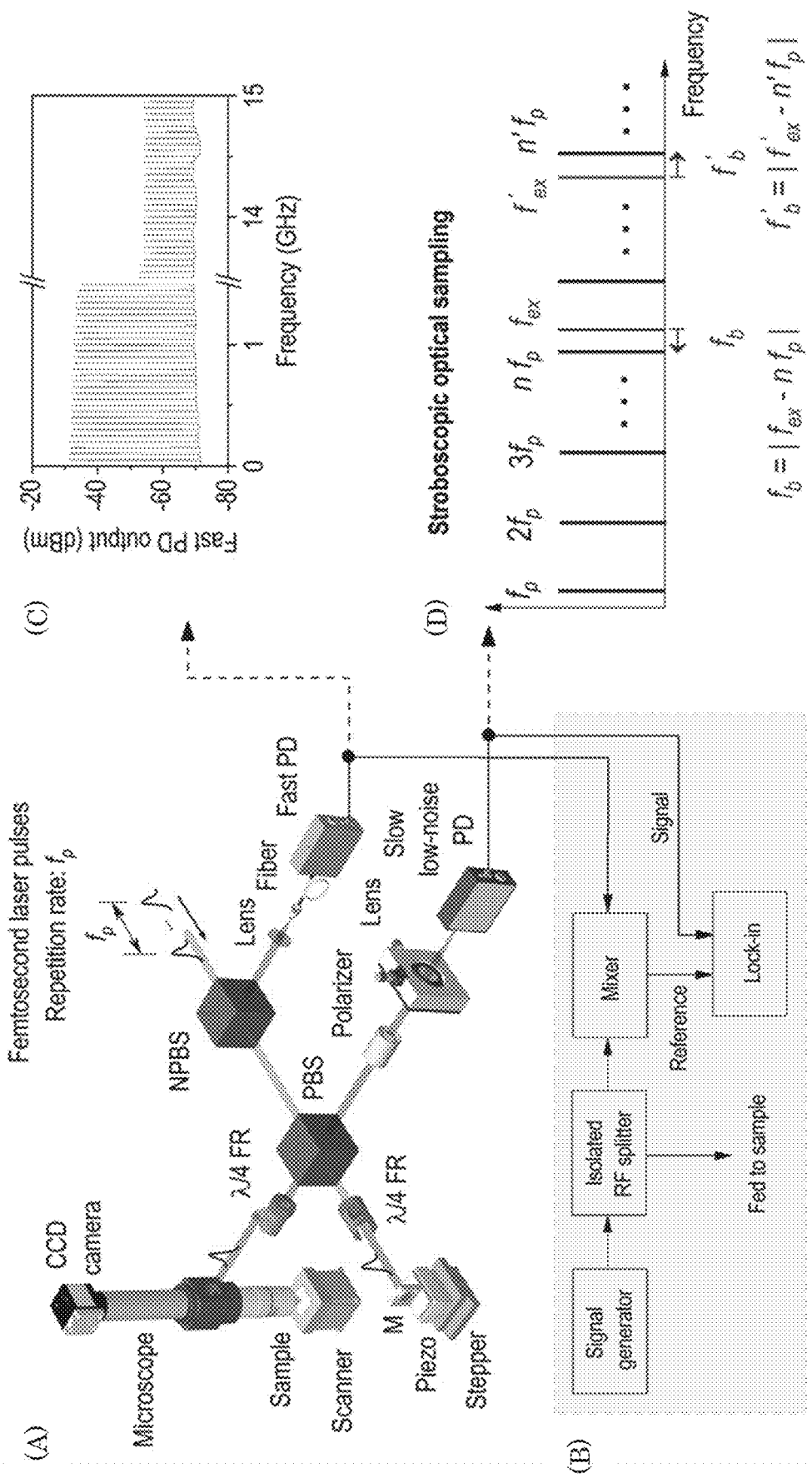
FIG. 7 shows a pulsed laser interferometer for stroboscopic optical sampling. (a) Schematic layout of the optical set-up. NPBS: non-polarizing beam splitter, PBS: polarizing beam splitter, PD: photodetector, M: mirror, $\lambda/4$ FR: quarter-wave Fresnel rhomb (45° polarized), Piezo: piezoelectric nano-positioner. The laser is collimated and 45° polarized before entering the NPBS. $\lambda/4$ FRs are used to manipulate laser polarization due to their wide spectral flatness. (b) Schematic layout of the electronics for device excitation, lock-in reference generation and signal detection. (c) Electrical spectrum of the laser pulse train obtained by directly measuring a split of the ultrafast laser using a fast PD (12.5 GHz) and a wide band spectrum analyzer, showing an electrical frequency comb with teeth equally spaced by the laser repetition rate, $f_p$. (d) The scheme of stroboscopic optical sampling in the frequency domain is illustrated as beating the excitation signal, at $f_{ex}$ (or $f'_{ex}$), with the electrical frequency comb using the tooth, at $nf_p$ (or $n'f_p$), resulting in a low-frequency beat note, at $f_b$ (or $f'_b$)

Pulsed laser interferometer 200 can include additional optical and electronic components including mirrors, waveplate 220, beam splitter 221, lens 222, vibration control signal 206, low pass filter 224, optical fiber, electrical communication lines (e.g., coaxial cable) and the like. In an embodiment, pulsed laser interferometer 200 includes scanning stage 207 that receives disposal of structural member 203 and scans a portion of structural member 203 that is subjected to laser pulses 204. A microscope can be placed in optical communication with structural member 203 for monitoring structural member 203 as shown in FIG. 7.

It is contemplated that a nominal wavelength of the laser pulses 204 is from 400 nm to 1700 nm, specifically from 600 nm to 1600 nm, and more specifically from 770 nm to 1560 nm. The pulse length can be from 10 fs to 50 ps, and more specifically from 100 fs to 1 ps. The pulse repetition rate can be from 1 MHz to 100 MHz, and more specifically from 25 MHz to 60 MHz. A frequency of teeth in the radiofrequency comb 202 can be from 1 MHz to 100 GHz, specifically from 25 MHz to 50 GHz, and more specifically from 50 MHz to 25 GHz. The vibrational frequency of the structural member 203 can be from 1 MHz to 50 GHz, specifically from 20 MHz to 30 GHz, and more specifically from 50 MHz to 20 GHz. The frequency of the interference frequency signal 213 can be from 1 kHz to 50 MHz, specifically from 500 kHz to 25 MHz, and more specifically from 1 MHz to 10 MHz.

Structural member 203 can include an arbitrary material including a metal, polymer, plastic, glass, ceramic, liquid, gas, solid, or a combination thereof and the like. Exemplary structural members 203 include microelectromechanical systems and can include micrometer-sized or nanometer-sized vibrating components, such as beams, bars, plates, strings, and membranes. Further, structural member 203 can be acoustic structures and can include surface acoustic waves devices, bulk acoustic devices, piezoelectric mechanical devices, and bulk materials excited by external forces.

An exemplary phase sensitive detector 223 is a lock-in amplifier. Reference frequency signal 211 and interference frequency signal 213 are electrically mixed together. By calculating the two quadratures of the mixed signals, the amplitude and phase of the vibration signal are determined.

The amplitude and phase measured by phase sensitive detector 223 is associated with the frequency of vibration control signal 205. Therefore, the frequency response of the structural member is determined by correlating the amplitude and phase at each frequency value for vibration control signal 205.

Pulsed laser interferometer 200 can be made in various ways. In an embodiment, a process for making pulsed laser interferometer 200 includes disposing structural member 203 on scanning stage 207; connecting structural member 203 to scanning stage 207; connecting scanning stage 207 to vibration controller 205 and signal mixer 210; disposing pathlength reflector 219 on pathlength control stage 218; connecting pathlength control stage 218 to interferometer controller 216 so that pathlength control stage 218 receives interferometer control signal 217 from interferometer controller 216; disposing pulsed laser 201 in optical communication with structural member 203, interference light detector 212, light pulse detector 208, and pathlength reflector 219; connecting signal mixer 210 to light pulse detector 208 and interference light detector 212; connecting phase-sensitive detector 223 to interference light detector 212 and interference frequency signal 213; and disposing beam splitter 221 and waveplate 220 in optical communication with pulsed laser 201, structural member 203, pathlength reflector 219, and detectors (209, 212).

Pulsed laser interferometer 200 can be assembled on a vibration-isolated optical table using free-space optics and optomechanical components, wherein rotational and translational degrees of freedom on optics and optomechanical components are used to align the pulsed laser 201 to interfere the two beam paths within the interferometer. Alignment of the interferometer achieves a detectable signal from phase sensitive detector 223.

In an embodiment, pulsed laser interferometer 200 can be assembled within an integrated enclosure including optics, optomechanics, microscope, and scanning stage.

Portions of the laser beam path within pulsed laser interferometer 200 can be confined within optical fiber rather than propagating in free space.

Assembly and operation of the pulse laser interferometer 200 can include these steps. In an embodiment, pulsed laser 201, optics (220,221,228,219,222), photodetectors (208, 212), vibration controller 205, interferometer controller 216, phase sensitive detector 223, radiofrequency mixer 210, radiofrequency power splitter 207, scanning stage 207, and structural member 203 are arranged and configured as shown in FIG. 1. Electrical connections (206, 209, 211, 213, 217) are made with radiofrequency coaxial cable as shown FIG. 1. Microscope 222 is focused on structural member 203, and scanning stage 207 is used to locate the laser spot at a region of interest. Pulsed laser interferometer 200 is locked to the quadrature point, or point of greatest slope, of the interference fringes. This is achieved by first getting the pulses from the two arms of the interferometer to overlap on photodetector 212. The path length of one arm of the interferometer is adjusted by piezo stage 219 until a maximum signal is detected on the photodetector, indicating that there is minimal delay between the two pulses and that the two arms of the interferometer are close in length. Piezo stage 216 is then scanned over a distance of a few optical wavelengths, approximately 5 micrometers, to determine the maximum and minimum values of the fringes as measured in voltage on photodetector 212. The average of the maximum and minimum values is used as the setpoint for interferometer controller 216 since it represents the quadrature point. Interferometer controller 216 is an integral control that keeps the two arms of the interferometer at a fixed length. Next, a radiofrequency signal from vibration controller 205 electrically drives structural member 203. This frequency is offset from the frequencies in the radiofrequency comb as shown in FIG. 1 as it is the offset frequency that is measured by phase sensitive detector 223. Optionally, the repetition rate of pulsed laser 201 can be adjusted so that a desired drive frequency of structural member 203 can be achieved. There are two output signals from photodetectors (208,212) that are processed by phase sensitive detector 223, reference frequency signal 211, and interference frequency signal 213. Low pass filter 224 is used on reference frequency signal 211 to remove harmonics. The filter can reduce noise in phase sensitive detector 223. Phase sensitive detector 223 was a lock-in amplifier that yields the amplitude and phase of interference frequency signal 213 relative to reference frequency signal 211. The frequency response of structural member 203 at a fixed location is measured by stepping through a series frequencies and measuring the amplitude and phase at each frequency. To image the mode shapes of structural member 203, a frequency sweep is measured at a series of locations on structural member 203, and the resulting data is processed to show the amplitude and phase spatially on structural member 203 for specific resonance frequencies.

Pulsed laser interferometer 200 has numerous advantageous and unexpected benefits and uses. In an embodiment, with reference to Example 1 and Example 2, a process for measuring vibrational amplitude and vibrational phase of structural member 203 with pulsed laser interferometer 200 includes: producing, by pulsed laser 201, laser pulses 204; subjecting structural member 203 to a plurality of laser pulses 204; producing, by vibration controller 205, vibration control signal 206; controlling, by vibration control signal 206, vibrational frequency and vibrational amplitude of structural member 203; receiving, by interferometer controller 216, interference frequency signal 213; producing, by interferometer controller 216, interferometer control signal 217 based on interference frequency signal 213; receiving, by pathlength control stage 218, interferometer control signal 217 from interferometer controller 216; moving pathlength control stage 218 in the motion controlled by interferometer control signal 217; changing, by pathlength control stage 218, the optical pathlength of propagation for laser pulses 204 in pulsed laser interferometer 200; receiving, by pathlength reflector 219, laser pulses 204 from pulsed laser 201; moving pathlength reflector 219 in concert with pathlength control stage 218 to change the optical pathlength of propagation for laser pulses 204; receiving, by light pulse detector 208, laser pulses 204 from pulsed laser 201; producing, by light pulse detector 208, light pulse detector signal 209 from laser pulses 204; receiving, by interference light detector 212, laser pulses 204 reflected from structural member 203 and laser pulses 204 reflected from pathlength reflector 219; producing, by interference light detector 212, interference frequency signal 213 from beat frequency produced from interference between laser pulses 204 reflected from structural member 203 and laser pulses 204 reflected from pathlength reflector 219; receiving, by signal mixer 210, light pulse detector signal 209 from light pulse detector 208; receiving, by signal mixer 210, vibration control signal 206 from vibration controller 205; producing, by signal mixer 210, reference frequency signal 211 from combination of vibration control signal 206 and light pulse detector signal 209; receiving, by phase-sensitive detector 223, reference frequency signal 211 from signal mixer 210; receiving, by phase-sensitive detector 223, interference frequency signal 213 from interference light detector 212; referencing, by phase-sensitive detector 223, interference frequency signal 213 from reference frequency signal 211; and producing, by phase-sensitive detector 223, vibrational amplitude signal 214 and vibrational phase signal 215 from interference frequency signal 213 referenced to reference frequency signal 211.

The process further can include changing a portion of structural member 203 that is subjected to laser pulses 204 by moving structural member 203 with scanning stage 207. In some embodiment, the process includes monitoring structural member 203 with a microscope.

The process further can include using steering mirrors located in the laser pulse path for moving structural member 203 with scanning stage 207. Scanning the laser pulses with a pivot about the back aperture of the microscope objective results in Cartesian scanning of the laser spot on structural member 203, resulting in vibration measurement across the surface of structural member 203.

Pulsed laser interferometer 200 and processes disclosed herein have numerous beneficial uses, including identifying mechanical resonances, measuring dissipation in these resonances, imaging the mode shapes of a mechanical system, and measuring acoustic dispersion in materials. Advantageously, pulsed laser interferometer 200 overcomes limitations of technical deficiencies of conventional compositions such as the limited bandwidth of photodetectors used in continuous-wave interferometers. A conventional continuous-wave interferometer includes a photodetector with bandwidth exceeding the mechanical motion that is measured. Amplified photodetectors that have bandwidth above 1 GHz can have a higher noise floor than slower photodetectors, which reduces the sensitivity of the measurement. Further, when using a photodetector with high bandwidth (e.g., greater than 1 GHz), electromagnetic interference can introduce noise to the photodetector and coaxial cable used to measure the output signal, resulting in a higher noise floor.

Pulsed laser interferometer 200 and processes herein unexpectedly do not need a high-bandwidth photodetector because the high-frequency vibration is converted to a low-frequency optical signal through optical mixing. This optical mixing is due to the optical interference process, in which the laser pulse downsample the vibration because the vibration frequency is equal to an integer multiple of the pulse repetition rate plus an offset frequency. As a result, a low-bandwidth photodetector is used, providing a low noise floor. Moreover, the electrical output signal of pulsed laser interferometer 200 is also at a low frequency, less than 50 MHz, and is therefore largely unaffected by attenuation in coaxial cables and electromagnetic interference.

The articles and processes herein are illustrated further by the following Examples, which are non-limiting.

EXAMPLES

Example 1. Imaging Gigahertz Dynamics in Micromechanical Resonators Using Ultrafast Pulsed Laser Interferometry Optical measurements of resonant MEMS can provide direct insight into their dynamics and guide improvements in device performance. Optical-based pulsed laser interferometry measures vibrations of MEMS resonators under coherent RF excitation with sub-picometer resolution and at arbitrary frequencies that can be greater than 10 GHz. Vibration amplitude and phase can be measured across an entire resonator to provide modal analysis and imaging of dynamics such as mode mixing.

Resonant MEMS operating at frequencies greater than 1 GHz provide filtering and signal processing in wireless communications and advanced computing. However, performance of these resonators is still not well understood, including their nonlinear dynamics, dissipation mechanisms, and vibrational modes. This is largely due to limitations in the measurement tools that are available. Electrical RF test equipment cannot provide information on mode shapes or the causes of acoustic loss. To overcome this technical limitation, the pulsed laser interferometer provides an interferometric approach to measure vibrations greater than 10 GHz with sub-picometer resolution and provides information for dynamics of resonators operating at a frequency greater than 1 GHz.

Conventional optical methods, including interferometric, photoelastic, and knife-edge techniques, use a continuous-wave (CW) laser whose frequency, phase, or intensity is modulated by resonator vibrations. For these methods, a photodetector with bandwidth greater than the vibration frequencies of interest must be used to measure the optical signal. However, resonator vibrations typically become progressively smaller with increasing frequency. Furthermore, the noise in photodetectors and amplifiers, parasitic capacitance and coupling in cables, and electromagnetic interference all increase with increasing frequency. The combination of these issues makes the use of conventional CW optical methods above 1 GHz extremely challenging.

Due to such limitations of conventional technology, ultrafast pulsed laser interferometry (PLI) was developed (FIG. 1(a)) and overcomes these limitations. The laser pulse train forms an electrical frequency comb with individual teeth equally spaced by the repetition rate ($f_p$), as measured using a first photodetector (FIG. 1(b)). By tuning $f_p$, one of the comb frequencies ($n*f_p$) can be placed close to the resonator excitation frequency ($f_{ex}$), with a measurable offset ($f_b=|f_{ex}-n*f_p|$). Thus, the laser pulse acts like a strobe that mixes down high-frequency vibrations to a beat signal, $f_b$. A low-bandwidth photodetector is used to measure $f_b$, which is processed with a lock-in amplifier. Conventional stroboscopic interferometric techniques are limited to operation below 1 GHz or at discrete, widely separated frequencies. The pulsed laser interferometer works at any frequency above 0.95 GHz with a noise floor comparable to a CW interferometer operating below 1 MHz ($\approx$30 fm/√Hz, which is shot noise limited).

Figure 3:
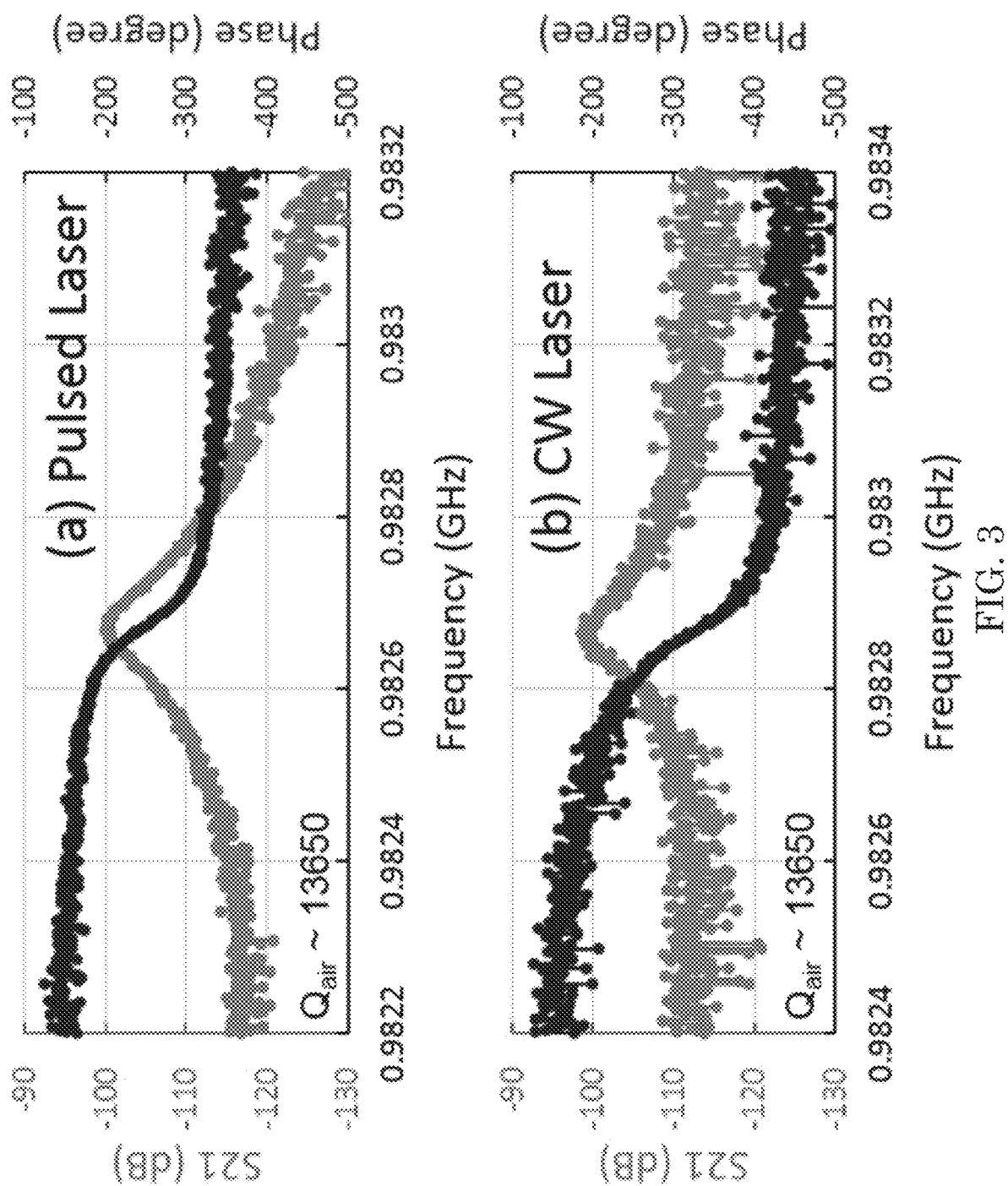
FIG. 3 shows graphs for a frequency response of BAR obtained by (a) pulsed laser interferometry and (b) CW laser interferometry. The resonator was operated in air with +10 dBm RF power and 21 V DC bias. The center frequencies differ slightly due to thermal drift and internal frequency inaccuracies in the different RF instruments used.
Figure 4:
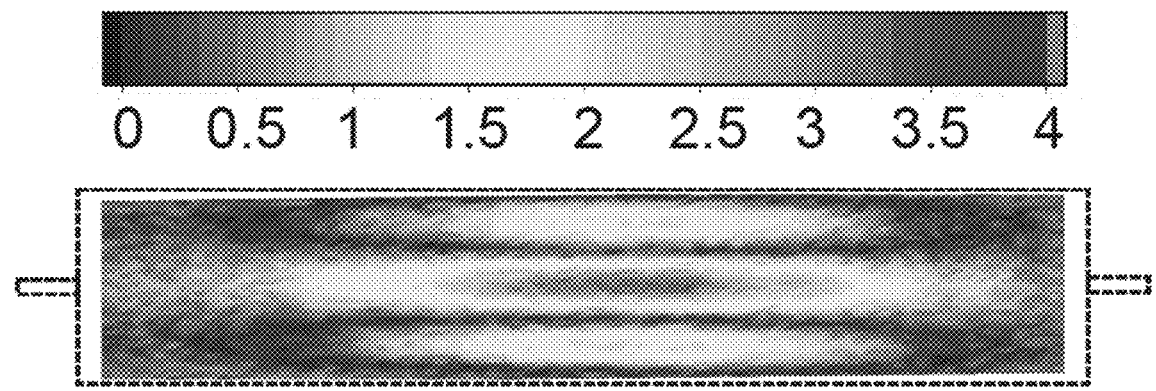
FIG. 4 shows mapping BAR vibrations at 0.9827 GHz using pulsed laser interferometry: (a) vertical vibration amplitude and (b) phase. Drive conditions: 21 V DC bias and +10 dBm RF power. The dashed lines represent the outer dimensions of the BAR, 11.5 µm×65 µm. The amplitude map clearly shows the expected third-order width-extensional mode. The phase transition along the width of the resonant body is nearly 180, as expected.
Figure 4:
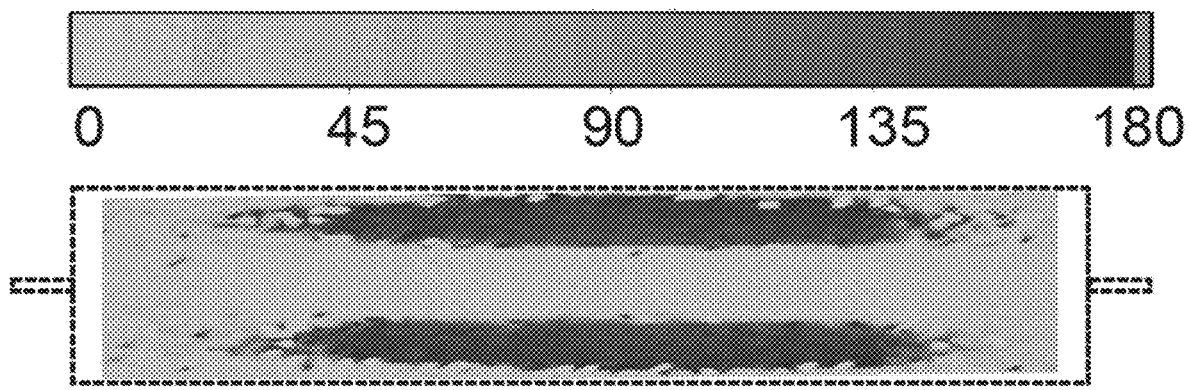

Vibration results for two MEMS resonators are presented here. The first is a silicon width-extensional bulk acoustic resonator (BAR) with a third-order in-plane mode around 0.983 GHz (FIG. 2(a)). The out-of-plane displacement is measured, which results due to the Poisson effect. The excitation was swept by 1 MHz around resonance, beating with the $19^{th}$ tooth (981.35 MHz) of the comb ($f_p$=51.65 MHz). The frequency response found with PLI is compared to that obtained by conventional CW laser interferometry in FIG. 3. The signal-to-noise ratio (SNR) is already 4 dB better for PLI while only just approaching 1 GHz. FIG. 4 shows surface maps of the vibration amplitude ($\approx$3 µm) and phase for the third-order mode.

Figure 2:
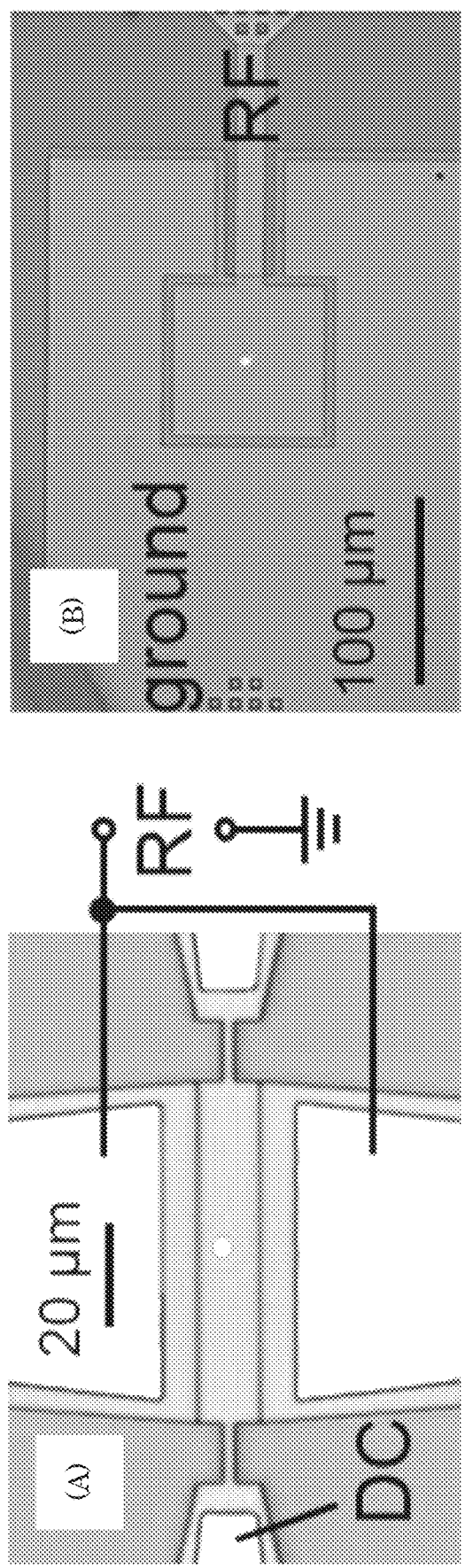
FIG. 2 shows (a) an optical micrograph of a silicon width-extensional bulk acoustic resonator (BAR) with a width of 11.5 µm. Its measured third width-extensional mode is approximately 0.983 GHz. (b) Optical micrograph of an AlN bulk acoustic wave (BAW) transducer with a measured resonance frequency of approximately 2.35 GHz. The transducer size is 75 µm×75 µm.
Figure 5:
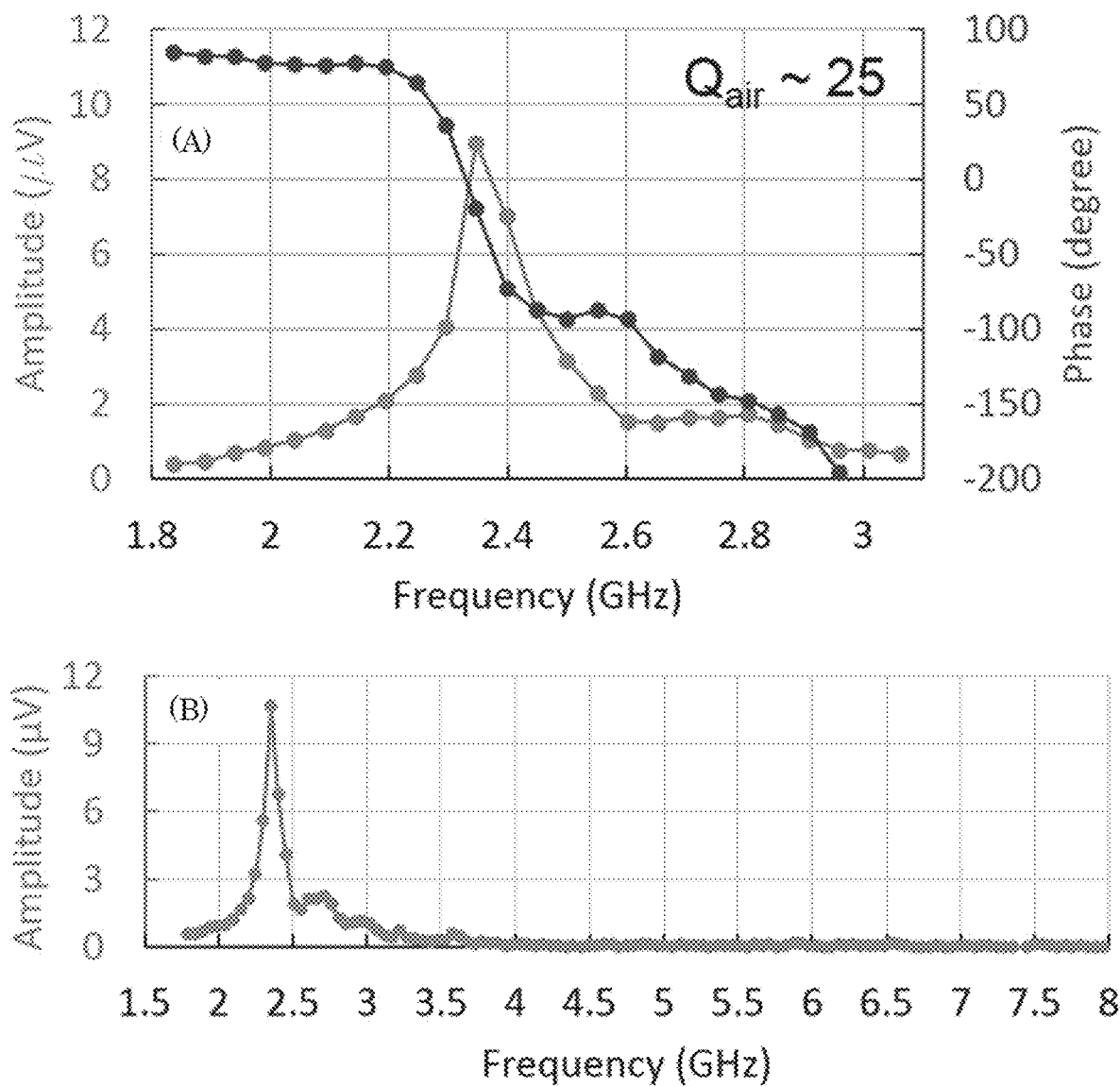
FIG. 5 shows a frequency response of AlN BAW obtained by pulsed laser interferometry while BAW was operated in air with +10 dBm RF power: (a) mechanical resonance at 2.35 GHz and (b) up to 8.0 GHz.
Figure 6:
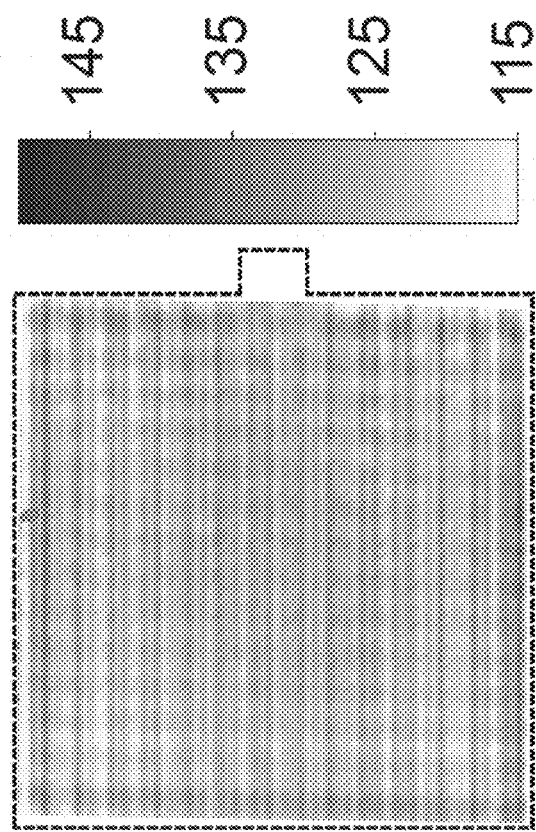
FIG. 6 shows mapping BAW vibrations at 2.351 GHz: (a) vibration amplitude and (b) phase. The dashed lines represent the perimeter of the BAW. The mode shape shows the superposition of the main thickness mode with other lateral resonance modes.
Figure 6:
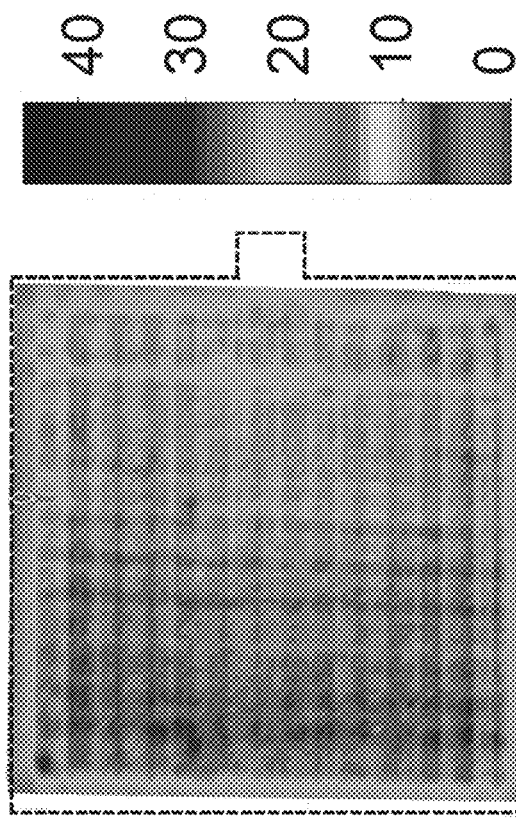

The second device is an AlN bulk acoustic wave transducer (FIG. 2(b)). Its fundamental mode at 2.35 GHz is extremely difficult to measure using CW laser techniques. Since the resonance linewidth spans multiple comb teeth, the measurement is performed here by using a series of teeth ($f_p$=50.0 MHz) while $f_b$ is kept constant. The frequency response of the first thickness mode is shown to have an SNR of nearly 30 dB (FIG. 5(a)) and the BAW can be measured out to 8 GHz (FIG. 5(b)). The vibration amplitude and phase maps (FIG. 6) show the superposition of multiple modes, demonstrating that PLI can reveal complex dynamics. Since both displacement and phase are obtained, animations of modes can be generated, making PLI an invaluable tool for investigating the dynamics of gigahertz resonators.

Example 2. Femtometer Scale Imaging of Coherent Vibrations at Super-High Frequency (>10 GHz)

Measurement of femtometer scale vibrations can be used for characterizing or developing ultra-coherent resonators for frequency control and ultrasensitive detectors for mass and force as well as quantum-state of motion. Conventional optical nanometrology are limited to the sub-picometer scale vibrations for frequencies at several gigahertz (GHz). The pulsed laser interferometer provides stroboscopic optical sampling of transduction of coherent super-high frequency vibrations and phase-sensitive absolute displacement detection at a noise floor of 55 fm/4 Hz well exceeding 10 GHz. The pulsed laser interferometer has a higher bandwidth and a significantly lower noise level than conventional devices and provides counting several tens to hundreds of coherent acoustic phonons in a nanomechanical resonator and approaches optical detection of near quantized oscillation. Resonators above 10 GHz with displacement only several tens of femtometer are imaged to reveal complex mode superposition and dispersion.

The various applications of mechanical resonators demand higher resonance frequencies, f, and also a higher coherence which is quantified by the mechanical quality factor, Q. Resonators with a high figure-of-merit, f·Q, would allow near-quantum-limited behaviors at more accessible temperatures and would also improve frequency band utilization and filtering efficiency for wireless communication. Particularly, a nanomechanical resonator in practice is desired for an ultra-coherent resonance mode and also at super-high frequencies that is not enveloped by other spurious modes and edge effects which generally increase background noise, acoustic leakage and decoherence rate. To guide and validate their operation, optical characterization is used to obtain a snapshot of different vibrational mode profiles, dissipation mechanisms, coupling dynamics, and the like.

Optical scanning interferometry, typically involving a continuous-wave (CW) laser, enables noncontact, high-resolution mapping of the phase-sensitive vibration profile. However, all variations of these systems are limited at sub-picometer scale at GHz frequencies; for instance, homodyne systems including Mach-Zender, Sagnac and Michelson, in which the device is excited at the same frequency as the small modulation to be measured, are difficult to work due to huge electromagnetic interference above 1 GHz; and to solve this interference problem, heterodyne systems provide the excited frequency offset from the detected signal, which are still limited by the high classical noise from a fast photodetector. On the other hand, the pump-and-probe technique, using ultrafast laser pulses for delay-controlled impulse excitation and probing, allows picosecond-resolution vibration nanometrology with a Fourier transformed frequency response up to several hundreds of GHz. It is however usually too low in spectral resolution to accurately recover the ultra-narrow linewidth of high-Q vibrations, no matter using an ultrafast laser with a wide repetition rate tuning range or using an addition laser intensity modulation.

The pulsed laser interferometer measures nanomechanical vibrations at microwave frequencies that uses a stroboscopic interferometer with femtosecond laser pulses to optically sample the motion. This work reduces the detection noise floor for microwave vibration measurement by nearly a factor of 7 compared to the state of the art and can operate out to 12 GHz. Pushing from the conventional picometer-range sensitivity at gigahertz frequencies into the femtometer range, optical nanometrology enters a regime for transduction of mechanical motions with an ultralow noise floor potentially revealing near quantized motion, which improves sensing of electromechanical and optomechanical systems.

The other split of the pulse enters a typical Michelson interferometer to probe the out-of-plane motion of the sample through a microscope objective with respect to the reference mirror.

In the pulsed laser interferometer, a femtosecond mode-locked fiber laser with a nominal wavelength of 780 nm, a pulse width of 120 fs, and a repetition rate ($f_p$) with a large tuning range between 50.0 MHz and 52.5 MHz have been demonstrated.

As shown in FIG. 7(a), the laser pulse train is first split to two and one of them is directly measured by a first photodetector (3 dB bandwidth at 12.5 GHz), forming a broadband electrical radiofrequency comb with individual teeth equally spaced by $f_p$, as shown in FIG. 7(c).

The average laser power at the detector for low-noise measurement is about 109 µW, similar to the power level for those conventional CW laser interferometers.

The sample is driven with a continuous-wave RF signal generator at an excitation frequency, $f_{ex}$. By adjusting $f_p$, one of the comb frequencies (n·$f_p$) can be placed close to $f_{ex}$, with a frequency offset ($f_b=|f_{ex}-n\cdot f_p|$) measurable at low frequencies, in which n indicates the tooth that is closest to $f_{ex}$. Thus, the laser pulse acts like a strobe that freezes high-frequency vibrations to a beat note at $f_b$, as shown in FIG. 7(d). A slow low-noise photodetector is used to measure the beat note for both the amplitude and phase, which is processed using a lock-in amplifier to further improve the signal-to-noise ratio (SNR), as shown in FIG. 7(b). On the other hand, the reference for lock-in detection is generated by mixing one isolated split of the excitation signal at $f_{ex}$ with the electrical frequency comb, followed by low-pass filtering and amplification, yielding a reference signal at the same frequency as the beat note under test (at frequency $f_b$) in all time. In this manner, any jitter in the laser repetition rate ($f_p$) would be cancelled, and therefore $f_p$ does not need to be feedback stabilized, nor to be synchronized to the vibration excitation signal. We note that this technique cannot measure any arbitrary frequency below 1 GHz, which can be already measured well by conventional optical techniques. The accuracy of this technique depends on the effective single wavelength selected among an ultrafast laser's broad and complex optical spectrum, which is used to calculate the absolute displacement. This has been well characterized if implementing interference of two laser pulses at a fixed delay particularly near zero delay.

There are two operating modes of this stroboscopic pulsed laser interferometry. For low-Q mechanical vibrations (resonance peak with wide spectral linewidth), the excitation frequency of the device (shown as the blue tooth in FIG. 7(d)) can be stepped through a wide frequency range to beat with multiple teeth in the comb. For each tooth in the comb, an excitation frequency is applied that is equal to the tooth frequency plus an offset frequency. Measuring at each comb tooth provides a broadband frequency measurement of the device. On the other hand, for high-Q mechanical vibrations (resonance peak with narrow spectral linewidth), the excitation frequency of the device is tuned in a small range near one tooth in the comb to capture a narrowband frequency measurement. A width-extensional silicon bulk acoustic resonator (BAR) with a high-Q mechanical resonance at 0.9827 GHz was measured by beating with only the 19$^{th}$ tooth for a $f_p$ tuned at 51.5 MHz when sweeping the excitation frequency across the narrow resonance peak by just 3 MHz. Ultralow noise vibration nanometrology was performed using a low-Q thin-film bulk acoustic wave (BAW) transducer up to 12 GHz. Measurements were made at room temperature under ambient condition.

Figure 8:
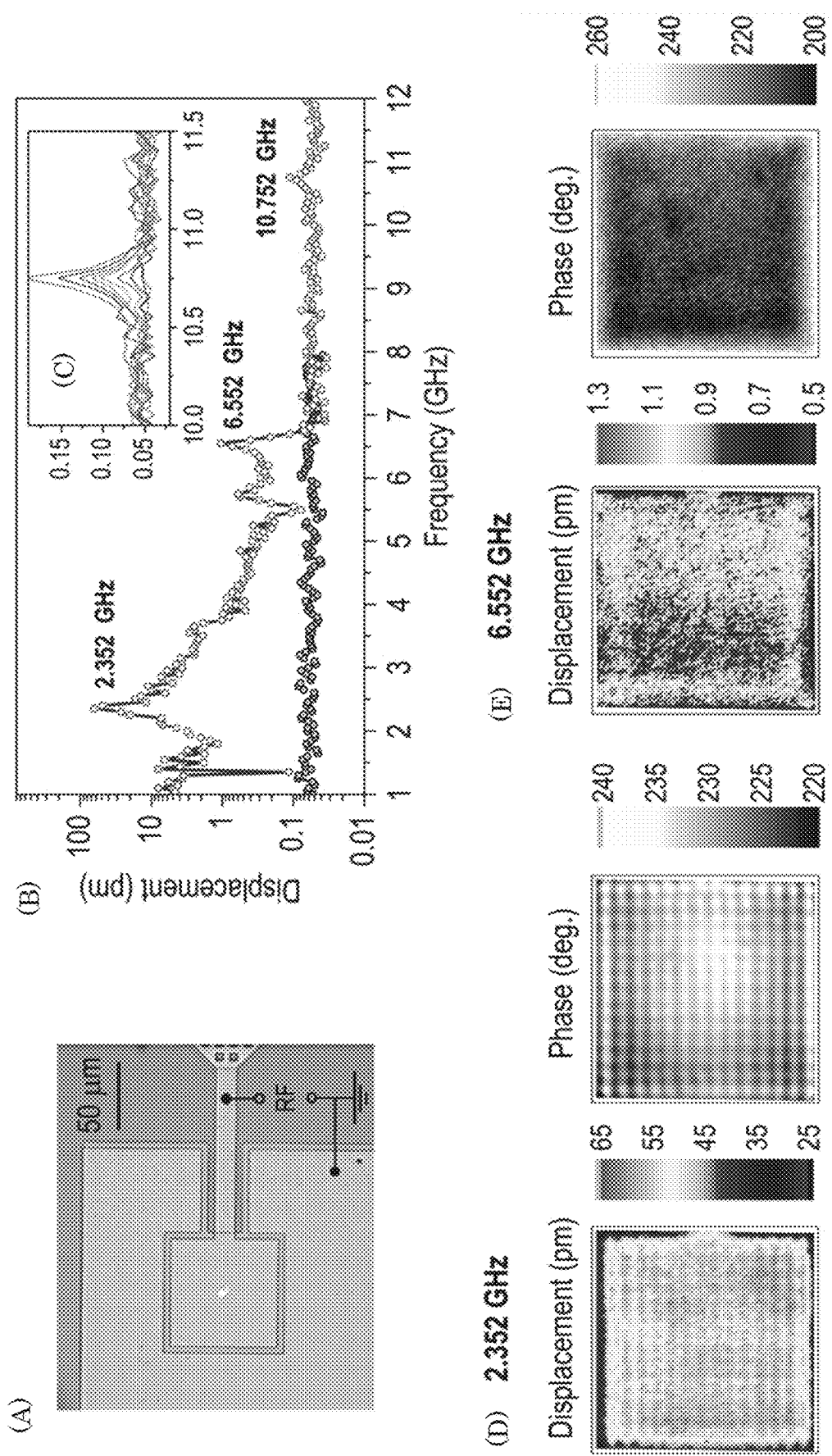
FIG. 8 shows imaging for nanomechanical vibrations up to 12 GHz. (a) BAW transducer with the focused laser spot near its center. (b) Broadband frequency response with applied RF power at +10 dBm, as shown in green. The applied frequency on the device varies from 1.002 GHz to 12.002 GHz with a step size at 0.050 GHz. The grey circles show the frequency response with the applied RF voltage on the BAW device disconnected. The detection bandwidth is 1 Hz and is kept constant. The error bars are smaller than the data points. (c) The inset shows that the fifth resonance at 10.752 GHz grows in intensity with the applied RF power varying from 0 dBm to +3, +5, +7, +9, +10, +11, +13, and +15 dBm, respectively. (d) and (e) Mapping the absolute vibration amplitude and phase at 2.352 GHz and 6.552 GHz respectively.

The pulsed laser interferometer was demonstrated on a piezoelectric thin film BAW transducer with 2 μm AlN sandwiched between thin molybdenum layers and capped with a layer of thin film oxide, which were grown on an oxidized silicon substrate (FIG. 8(a)). The device was driven by a RF power across the AlN layer, which generates mechanical vibrations due to the $d_{33}$ piezoelectric coupling. Since this device is an unreleased acoustic transmitter, its resonance linewidth is expected to span multiple comb teeth and therefore the measurement is performed here by using a series of teeth ($f_p\approx50.0$ MHz) while $f_b$ is kept constant. The broadband frequency response of the first three thickness modes is shown in FIG. 8(b) with applied RF power at +10 dBm. The BAW was measured from 1.002 GHz to 12.002 GHz with step size same as $f_p$. For each step of the excitation frequency, it beats with a different tooth of the electrical frequency comb. For determining an exact resonance frequency, a narrower but finer sweeping around the proximity of the expected peak frequency can be performed by beating with the same tooth in the comb for which an arbitrarily fine spectral resolution can be achieved.

The first thickness mode is measured at 2.352 GHz and shown to have an SNR of nearly 1000 times (30 dB), while the third mode at around 6.552 GHz splits into two closely coupled resonant modes. The fifth mode is measured at 10.752 GHz with the inset showing the change in amplitude when varying the driven RF power with the smallest amplitude detected at only tens of femtometers, confirming that the measured peak is resulted from mechanical motions. The grey circles represent noise, which were obtained as the frequency response with the RF power applied to the BAW disconnected, showing a low noise floor maintained flat up to 12 GHz at approximately 55 fm. FIGS. 8(d) and 8(e) show the vibration amplitude and phase maps at the first and third thickness modes, respectively, obtained by raster scanning across the BAW surface. Energy leaking through the electrical tracing at the right side of the BAW can be clearly observed for both resonant modes. Superposition of multiple lateral modes at the frequency of the first thickness mode was mapped, revealing that a thin-film BAW resonator supports several wave modes with different wave vectors even when excited at a single frequency.

Figure 9:
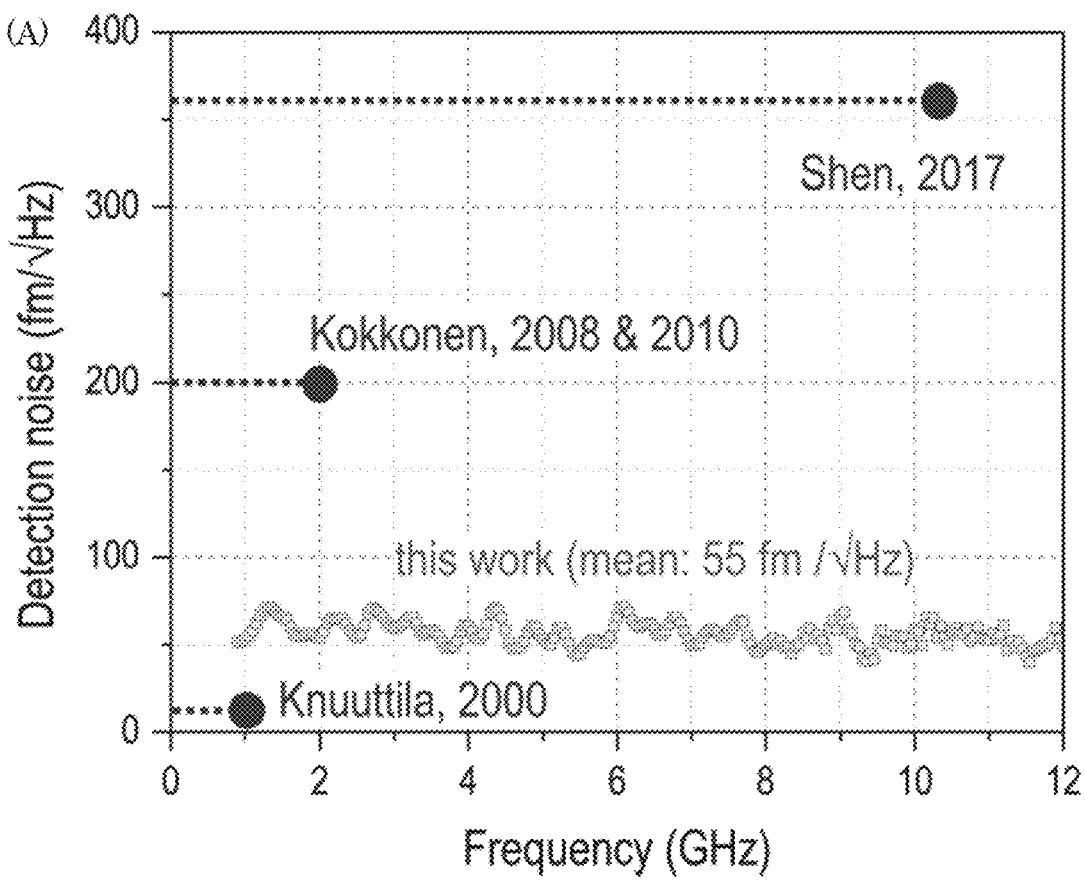
FIG. 9 shows noise of stroboscopic optical sampling at super-high frequencies. (a) Comparison between the noise floor of this work obtained by disconnecting the excitation signal to the device under test (shown in red) and the noise floor for the state-of-the-art CW laser interferometry (shown in blue), for both measurable bandwidth and noise. (b) Vibration amplitude of the third mode (6.552 GHz) and fifth mode (10.752 GHz) of the BAW while the excitation power is gradually reduced, yielding a noise floor around 55 fm (red dash-dot line). The relationship between the logarithmic dynamic displacement and RF power in dBm is highly linear as expected because the driven motion is governed through the inverse piezoelectric coupling, $\varepsilon_3 = d_{33}\varepsilon_3$. The arrow shows a 10 fm difference (from 70 fm to 80 fm) in displacement at 6.552 GHz while the excitation power is increased from −11 dBm to −10 dBm.
Figure 9:
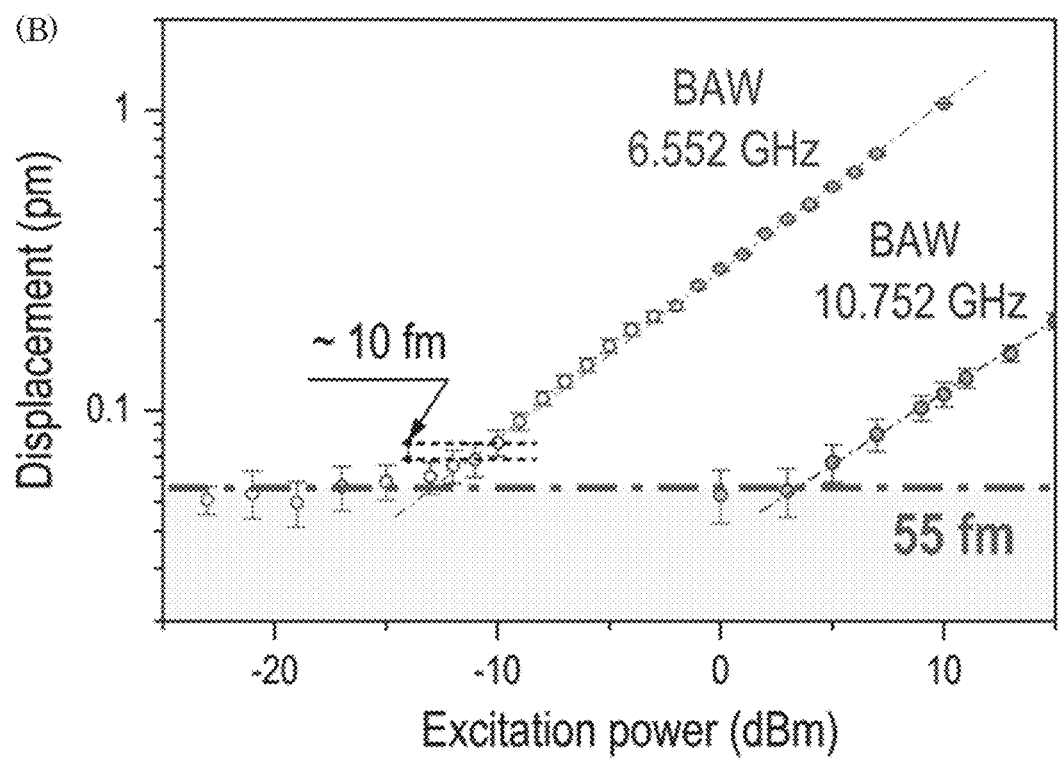

Detection noise is a figure-of-merit for vibration and wave metrology methods and determines their smallest detectable displacement among various sources of noise, including shot noise due to quantum statistics, dark noise from the PD, and the noise from electromagnetic interference, other electronic components, etc. Wide band noise floor was measured by focusing the laser spot at the center of the BAW and recording its displacement as the BAW disconnected from the excitation frequency, which was swept up to 12 GHz. This experimentally obtained noise floor is represented as the red curve in FIG. 9(a), showing an almost flat displacement noise at approximately 55 fm/Hz up to 12 GHz. The achieved noise is compared with conventional CW laser interferometry used for mechanical nanometrology and shown as blue horizontal lines (indicating reported noise level) with circles to their right (indicating highest achievable frequency). The achieved noise floor for the pulsed laser interferometer is reduced by 7 fold in comparison with conventional metrology at frequencies around 10 GHz. Because of the nature of stroboscopic sampling, the noise floor can be maintained at this level to several tens of GHz by simply replacing signal-processing electronics with faster speed.

The noise floor was verified by recording the vibrational amplitude of the third and fifth modes of the BAW as the driven RF power was gradually reduced, until the modes were not distinguishable anymore as shown in FIG. 9(b). For both resonant modes, the lowest displacement measured is approximately 55 fm in a 1 Hz resolution bandwidth, consistent with the flat noise floor up to 12 GHz obtained in FIG. 9(a). The arrow in FIG. 9(b) shows that we can distinguish a 10 fm difference (from 70 fm to 80 fm) for displacement in super-high frequencies. There is room for further suppression of the noise because the conventional floor for measuring CW laser interferometric fringes around the frequency range of 100 kHz-1 MHz is single digit femtometer for a 1 Hz detection bandwidth. Since the pulsed laser interferometer transformed multi-GHz vibrations to this frequency range, the pulsed laser interferometer can recover such a noise floor through optimizing laser stability, laser power, performance of the electronic components, and the like. An improvement of noise suppression by another order of magnitude can provide observation of near quantized coherent oscillation in nanomechanical resonators, yielding sensitivity of a resonator-based sensor.

Figure 10:
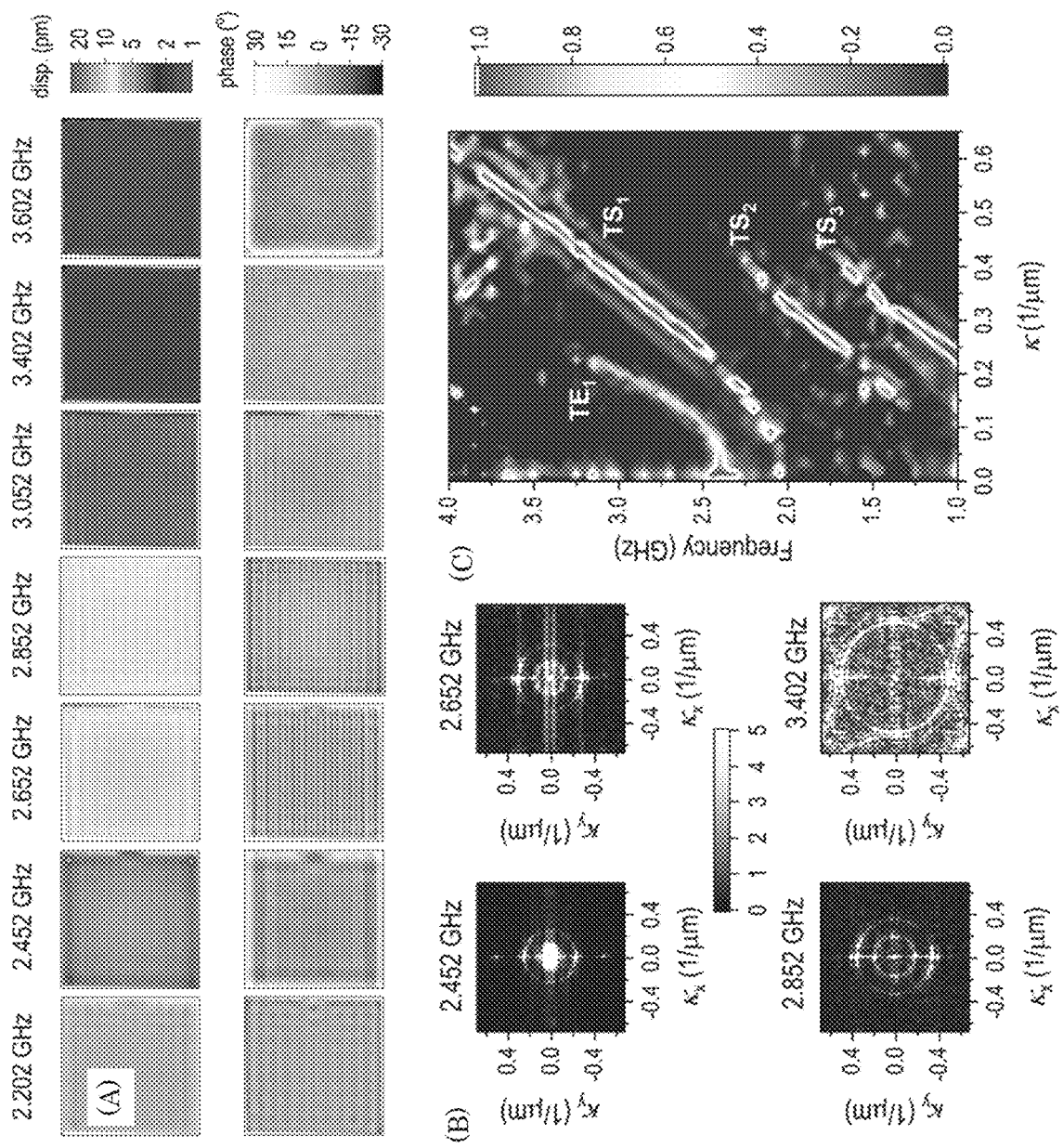
FIG. 10 shows vibrational wave field mapping and acoustic dispersion. (a) Mapping of vibration amplitude and phase of the BAW transducer for a wide range of frequencies up to the super-high frequency (SHF) range. (b) Spatial 2-dimensional fast Fourier transform (2D-FFT) of the phase mappings for four representative frequencies. (c) Dispersion diagram extracted from the 2D-FFT of the phase mappings from 1 GHz to 4 GHz, showing four acoustic modes of the BAW material system.

To demonstrate Fourier analysis of phase-sensitive vibrational wave fields, we optically mapped the amplitude and phase of the BAW from 1 GHz to 4 GHz and performed spatial Fourier analysis on these maps to separate the constituent waves with different wavelengths and propagation directions. FIG. 10(a) shows such maps for several representative excitation frequencies, where superposition of high-order in-plane modes in both the $\kappa_x$ direction and the $\kappa_y$ direction are clearly visible but are relatively weaker in the $\kappa_x$ direction aligned with the electrical tracing as a path for vibrational energy leaking. This is also revealed as the brighter spots along the $\kappa_y$ direction shown in FIG. 10(b), which was obtained by 2-dimensional spatial fast Fourier transform conducted upon the phase mappings. Nevertheless, the symmetric transformed results due to the resonator geometry is clearly seen, and in this case, it is feasible to extract the dispersion curves along one of the principal axes, such as the $\kappa_y$ axis, to obtain a better SNR. The dispersion curves extracted from the mapped wave fields for the BAW material system are shown in FIG. 10(c), presenting the evolution of the wave modes as a function of frequency. The $TE_1$ mode ($1^{st}$ thickness-extensional mode) is clearly identified because it initiates from the first thickness mode at 2.352 GHz, where a bright red high-amplitude spot is localized near $|\kappa|=0$. The rest of the three curves are known as the thickness shear modes to this BAW material system; they are featured by an opposite trend to the thickness-extensional mode as they are associated with weak amplitude near the regime where $|\kappa|=0$ because the interferometer does not measure a pure horizontal displacement.

The pulsed laser interferometer images super-high frequency nanomechanical vibrations by stroboscopic optical sampling using an ultrafast pulsed laser without active stabilization for its pulse repetition rate. The pulsed laser interferometer uses light strobes, optically mixes coherent GHz vibrations down to low-frequency signals that can be measured by an ultralow noise fashion. A flat noise floor at around 55 fm/√4 Hz can be maintained from 1 GHz up to at least 12 GHz, leading to a vibration detection resolution down to the femtometer range at super-high frequencies for the first time, which provides distinguishing quantized coherent phonons in nanoscale mechanical resonators. The pulsed laser interferometer provides information about resonant dynamics at multi-GHz, quantum electromechanics, optomechanics, mass sensing, imaging, and coherence.

In the pulsed laser interferometer, the ultrafast pulsed laser was first attenuated, converted to 45° polarization, and collimated before entering the set-up shown in FIG. 7(a). After passing the non-polarizing beam splitter and upon entering the Michelson interferometer at the broadband 50/50 polarizing beam splitter, the laser is split into the measurement arm and the reference arm. This type of two-beam interferometer is widely used for accurate displacement metrology and provides a relatively simple optical layout. The reference arm mirror is mounted on a piezoelectric nano-positioner used for motion of a few micrometers with nanometer resolution, which sits on a piezoelectric stepper stage used for large motion. Controlled motion of this mirror is used to adjust the optical path length of the reference arm so that its length is the same as that for the measurement arm, and it stabilizes the sensitivity of the interferometer as well by locking to the quadrature point of the fringes. The optical path lengths of the two arms can be smaller than 120 fs (or equivalently 36 μm) so that the two splits can interfere. On the other hand, the spacing between two neighboring pulses is 20 ns (or equivalently 6 m), which guarantees that there is only one laser pulse entering the interferometer at any time. The measurement arm focuses the probe pulses onto the sample using an IR-compensated long working distance microscope objective, while the sample is mounted on a three-axis scanning nano-positioner, allowing for mapping of the vibrational wave field. The beams reflected by the two arms of the interferometer recombine at the same beam splitter and exit the interferometer for measurement.

Analytical principle of stroboscopic optical sampling. The sample is driven by a continuous-wave RF power at an excitation frequency, $f_{ex}$. Assuming in the linear transduction regime, the resulted voltage output due to sampling can be written as $$V = \sum_{k=-\infty}^{\infty} \delta(t - kT_p + t_d) \cdot V_0 e^{-i(2\pi f_{ex}t + \theta_s)}, \quad (1)$$

in which $T_p=1/f_p$ is the periodicity of the laser pulse train, $t_d$ is the time delay of the laser pulse arrival on the device under test (determined by the instrument delay), $V_0$ is the amplitude of the fringes, and $\theta_s$ is the phase. Due to the self-transforming property of the Dirac comb and the convolution theorem, the Fourier transform of equation (1) is $$\tilde{V} = V_0 \sum_{k=-\infty}^{\infty} 2\pi\delta(f - (kf_p - f_{ex}))e^{i(2\pi kf_p t_d + \theta_s)}. \quad (2)$$

Although multiple frequency components are involved, the component at only the lowest beat frequency will show up due to the slow response of the low-noise photodetector, yielding $$V = V_0 \exp\{i([2\pi(nf_p - f_{ex})t + (2\pi nf_p t_d - \theta_s)]\}. \quad (3)$$

The beating process during optical sampling, self occurs between $f_{ex}$ and the closest tooth of the comb. A slow low-noise photodetector is used to measure this beat note, and then it is processed using a lock-in amplifier. The lock-in reference is generated by mixing one the excitation signal at $f_{ex}$ with the pulsed laser train, yielding a reference signal at the same frequency as the beat note:

$$V_r = V_L \exp\{i[2\pi(nf_p - f_{ex})t + (2\pi nf_p t'_d - \theta_{ex})]\}. \quad (4)$$

in which $V_L$ is the reference amplitude, $t'_d$ is the time delay in the reference generation circuit and $\theta_{ex}$ is the phase of the excitation signal. Therefore, the in-phase component for lock-in detection becomes:

$$X = \frac{1}{2}V_0 V_L \cos(\theta_s - \theta_{ex} + 2\pi f_p(t_d - t'_d)). \quad (5)$$

where $V_L$ and $\theta_{ex}$ are known, and $2\pi nf_p(t_d - t'_d)$ is a constant offset depending on the setup cabling. Therefore, $V_0$, representing vibration amplitude, and $\theta_s$, representing vibration phase, can be retrieved by lock-in detection.

Additional experimental details. Before mapping the vibrational wave fields of the sample, we first find the mid-fringe quadrature point of the Michelson interferometer by measuring the interferometric fringes using the slow PD (shown in red in FIG. 12 in supplementary information) while the piezoelectric nano-positioner, where the reference mirror sits on, is driven by a triangular wave (shown in blue dashed line in FIG. S2) with the PID controller turned off. This multi-fringe excursion is used here to demonstrate that the amplitude of the fringes is a function of the percentage of overlap between two interfering pulses. In the meantime, the quadrature point can be determined as the nodes of the sinusoidal fringes. This setup can actively stabilize the interferometer to the quadrature point by integral control for maximized detection sensitivity.

We then find the effective wavelength of pulsed laser interferometry because the optical spectrum of a femtosecond pulsed laser is usually broad and complex, unlike single-wavelength CW HeNe lasers. To achieve this purpose, field auto-correlation is obtained by stepping the reference mirror through a wider overlapping range of the two interfering splits over many fringe periods, as shown in red in FIG. 15. The asymmetry about zero delay time is caused by the difference in the optical spectra of the two interfering pulses reflected back from the reference mirror and the sample surface, respectively. Based on this set of fringes, along with fringes obtained simultaneously as its quadrature, the interferometric effective wavelength can be calibrated with the help of a frequency stabilized HeNe laser and is shown in blue in FIG. 15. Because the optical paths of the interferometer are carefully adjusted such that the two interfering pulses are perfectly aligned in time, a constant effective wavelength near zero delay time can be assumed and a value of 783.6 nm can be used to calculate the absolute amplitude. Such a near-zero-delay assumption is valid because the delay between two interfering pulses caused by a typical nanomechanical displacement of 1 nm is only 0.007 fs.

Example 3. Effective Wavelength of Pulsed Laser Interferometry (PLI)

Figure 11:
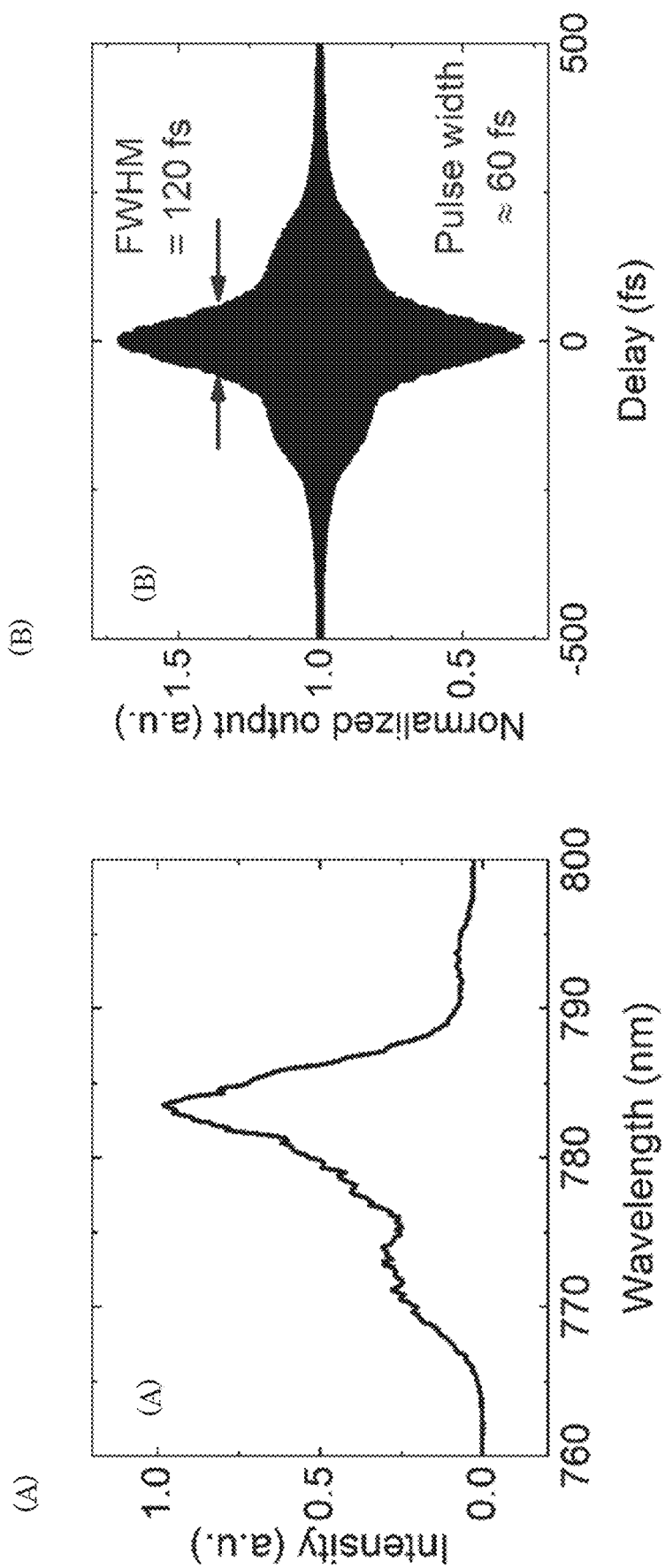
FIG. 11 shows characteristics of ultrafast laser pulses. (a) Optical spectrum shows a relatively broad and complex spectrum unlike that of a single-frequency continuous-wave laser commonly used in interferometry. (b) Field auto-correlation of the ultrafast laser showing a full width at half maximum (FWHM) approximately 120 fs.

Two-beam laser interferometers can be used in vibration detection to measure the relative phase, $\phi$, between the measurement and reference beam paths to determine displacement, d, using $d=\phi\cdot\lambda/(4\pi)$, where $\lambda$ is the laser wavelength. Since ultrafast pulsed lasers have a broad and typically complex optical spectrum as shown in FIG. 11(a), unlike single wavelength CW lasers, there is ambiguity in the value of $\lambda$ when using PLI. FIG. 11(b) shows the field auto-correlation consisting of very dense sinusoid enveloped by a decaying function for large delay between the two interfering laser pulses.

Figure 12:
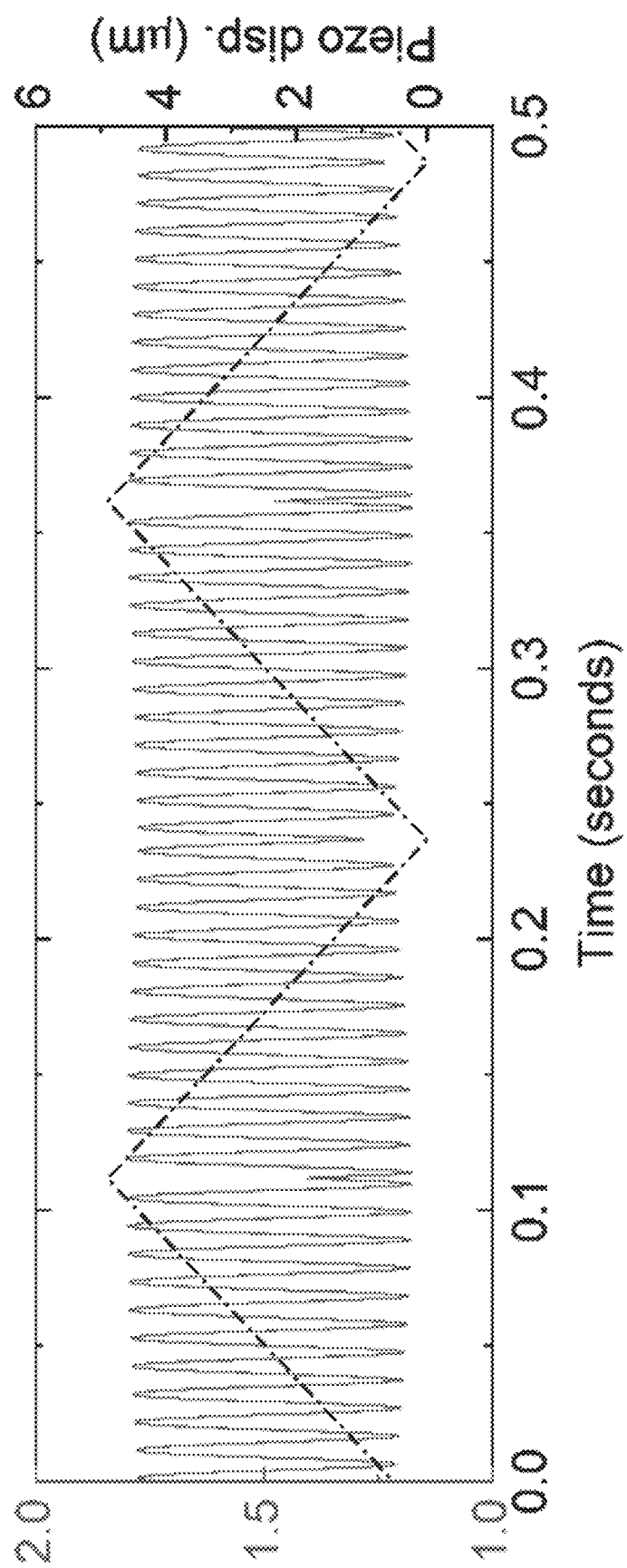
FIG. 12 shows fringes of PLI. The red curve shows the fringes measured by the slow photodetector while the reference mirror is driven by a 50:50 triangular wave shown in blue

The fringes for PLI are defined by a single wavelength, as shown in FIG. 12. However, this effective wavelength, $\lambda_{eff}$ varies significantly as a function of overlap between the interfering pulses due to pulse asymmetry and nonlinear chirp. A Michelson interferometer that combines PLI and CWLI (continuous-wave laser interferometry) is thus used to measure the variation in $\lambda_{eff}$ as a function of time delay between interfering pulses, as shown in FIG. 13.

Figure 13:
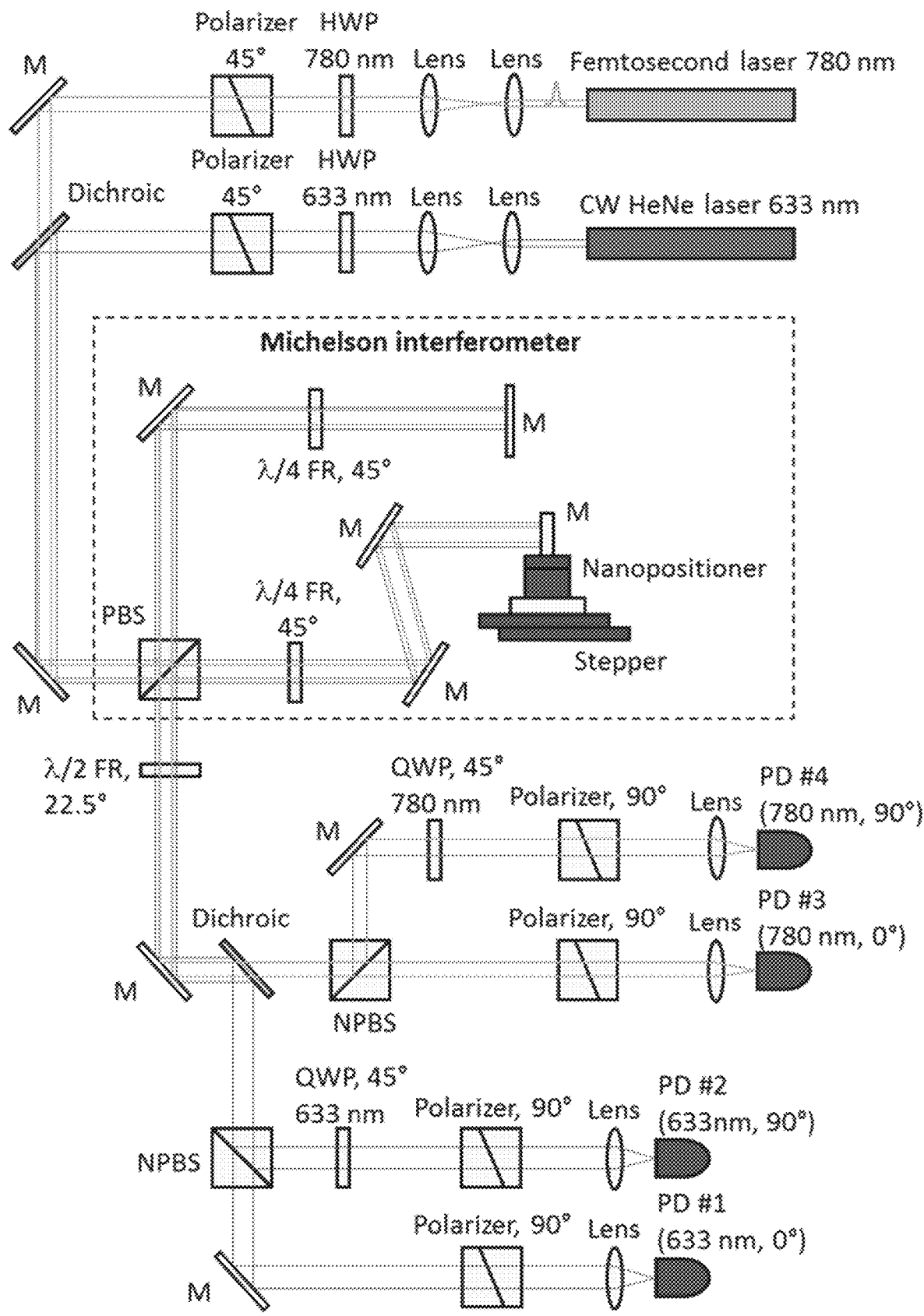
FIG. 13 shows a setup for characterizing $\lambda_{eff}$. A Michelson interferometer using pulsed laser interferometry (PLI) and continuous wave laser interferometry (CWLI) simultaneously with two-quadrature readout for each laser path. HWP: half-wave plate, QWP: quarter-wave plate, M: mirror, PBS: polarizing beam splitter, NPBS: non-polarizing beam splitter, $\lambda/2$ FR: half-wave Fresnel rhomb, $\lambda/4$ FR: quarter-wave Fresnel rhomb, PD: photodetector.
Figure 14:
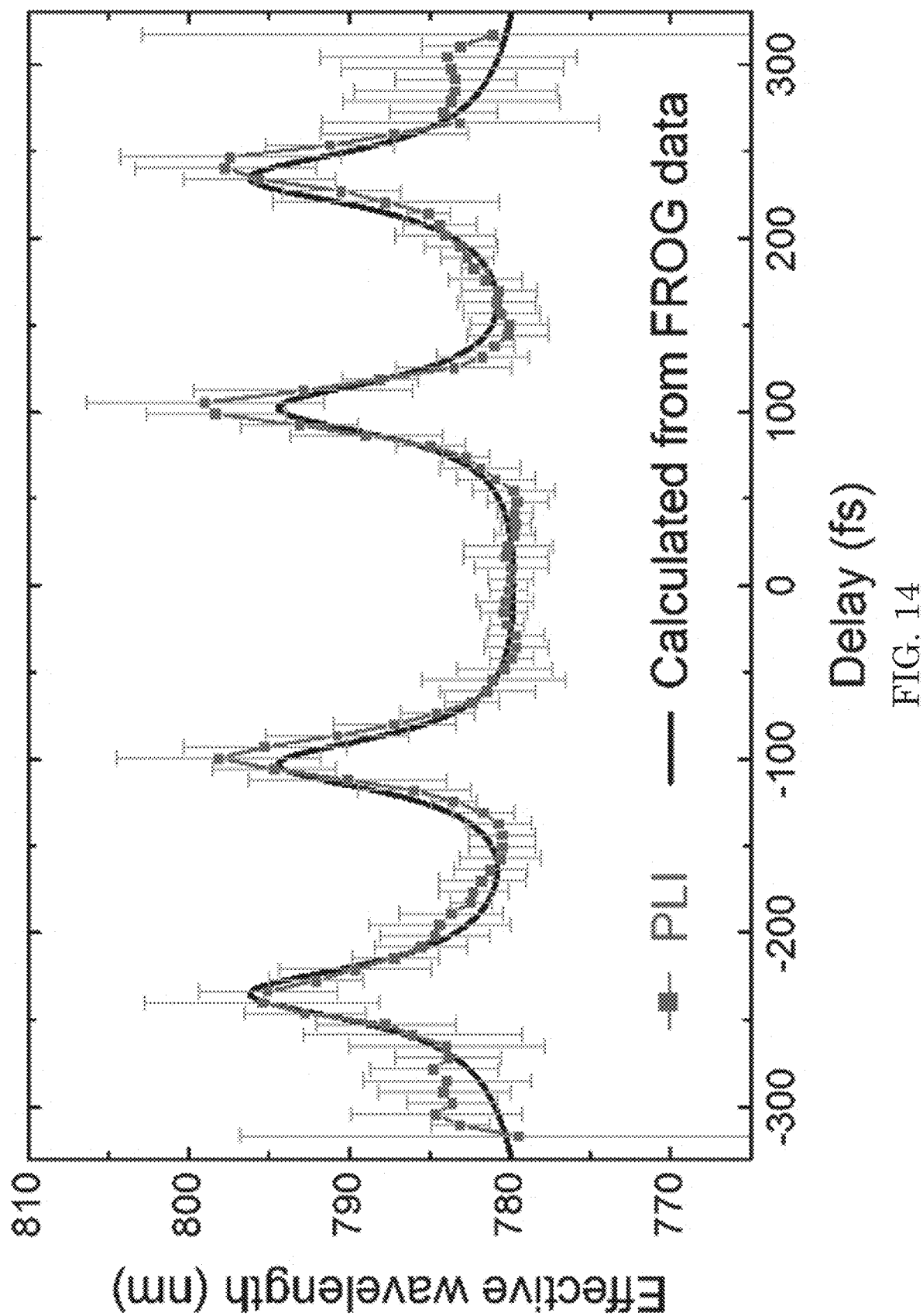
FIG. 14 shows $\lambda_{eff}$ for pulsed laser interferometry. $\lambda_{eff}$ measured by PLI (red, error bars represent $+/-\sigma$), $\lambda_{eff}$ calculated using experimental pulse characterization data (blue)

Using the setup shown in FIG. 13, fringe data from the PLI and CWLI were collected simultaneously while the stepper in the measurement arm moved linearly over 100 µm (nominal step size=0.01 µm, step dwell time=0.1 second), which is equivalent to a delay range between the two interfering pulses of approximately +/−333.5 fs. The two quadratures from the CWLI provide raw fringe data that is used to calculate the phase angle, #c, using a well-established data processing procedure. To obtain the displacement, d, $\phi_C$ is then unwrapped and multiplied by $\lambda/(4\pi)$, where $\lambda$ is the wavelength of the helium-neon laser (i.e., 632.82 nm for the temperature, pressure, and relative humidity during the experiments). Using $\lambda=4\pi d/\phi$, $\lambda_{eff}$ can then be determined as a function of pulse delay by dividing the CWLI-obtained displacement, d, by the PLI-obtained phase, $\phi_P$, for each 1 µm increment measured over the 100 µm stepper displacement. The results for $\lambda_{eff}$ are shown in FIG. 14 for 10 measurement runs. It is clear that although the variation in $\lambda_{eff}$ is quite significant, $\lambda_{eff}$ is almost a constant value for near-zero delay between the two interfering pulses. Therefore, there is a single $\lambda_{eff}$ that can be used to calculate displacement as long as we keep the delay small while operating the interferometer, which can be achieved by active stabilization.

To obtain $\lambda_{eff}$ for the condition that one arm replaced with a sample through a microscope objective, we ran the above experiment again with the laser pulses in one of the arms focused on the surface of a BAW transducer while in the other arm reflected back from a mirror mounted on a piezoelectric nano-positioner sitting on a stepper. This measurement is used because the effective wavelength depends on the spectra of the two interfering pulses, and the reflections occurring at the BAW and the reference mirror have different influence on the laser spectrum. We obtain the fringe data by stepping the mirror through the overlapping duration of the two interfering laser pulses, which is also the field auto-correlation data shown as the red curve in FIG. 14. Based on the fringe data with its quadrature, along with fringes obtained simultaneously using a frequency stabilized HeNe laser as described above, we can calculate the $\lambda_{eff}$ for performing PLI on the BAW transducer, as shown in blue in FIG. 15. $\lambda_{eff}$ is found to be 783.6 nm for near-zero delay.

Figure 15:
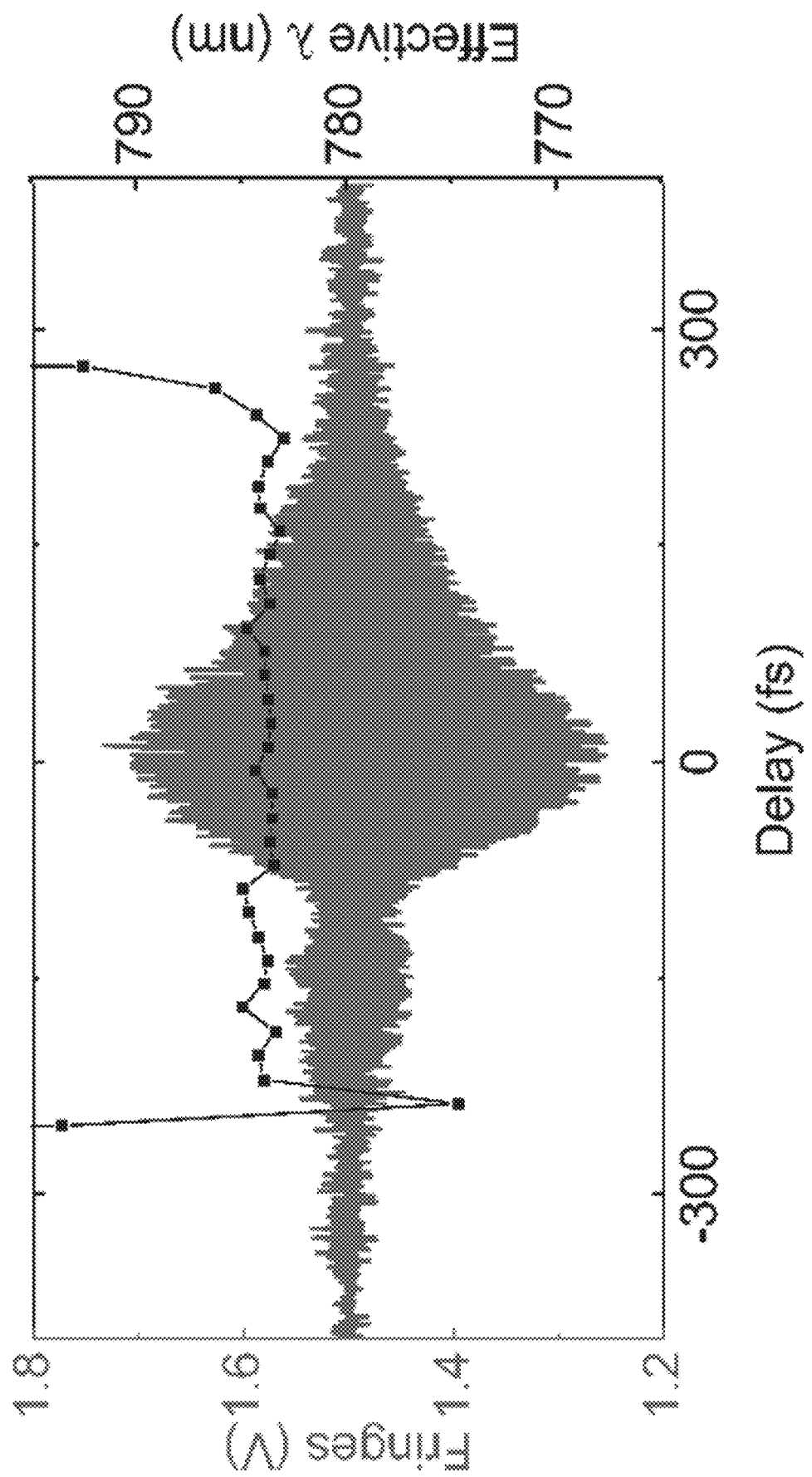
FIG. 15 shows field auto-correlation and $\lambda_{eff}$. The field-autocorrelation is shown in red while the calculated $\lambda_{eff}$ is shown in blue.

The gain factor converting voltage to displacement can be accurately measured as the slope at the quadrature point for those fringes with maximum peak-to-peak voltage, $V_{pp}$, in FIG. 15. For each period in the sinusoidal fringe data, the displacement is half of the optical wavelength, which is the $\lambda_{eff}$ for PLI. Therefore, the gain factor can be easily found as $$\text{Gain} = 2\pi \frac{V_{pp}}{\lambda_{eff}},$$

and by this gain factor, the voltage sign obtained using a lock-in amplifier can be converted into absolute displacement.

The above approach is a conventional method to trace the absolute displacement in SI unit using optical interferometry. The difference is that an effective optical wavelength is used here assuming a fixed delay time for pulsed laser interference, comparing to a well-established single wavelength for a CW laser. Thus, the uncertainty of the measured displacement is dominantly determined by the uncertainty in $\lambda_{eff}$, which varies as a function over the delay (or the displacement under test). We have shown in a prior work that the uncertainty in $\lambda_{eff}$ is about 100 ppm, which is only a little more than an order of magnitude larger than the wavelength uncertainty for those stringently stabilized helium-neon lasers used for CWLI, making it eligible to use PLI for accurate displacement measurements.

This uncertainty may be further improved by controlling pressure and temperature, reducing the environmental noise due to acoustics, airflow, and temperature drift, and achieving greater stability for the pulsed laser. We note that the jitter in the optical frequency components of a typical ultrafast laser ranges from hundreds of hertz to thousands of hertz, negligible for interferometry measurements.

Figure 16:
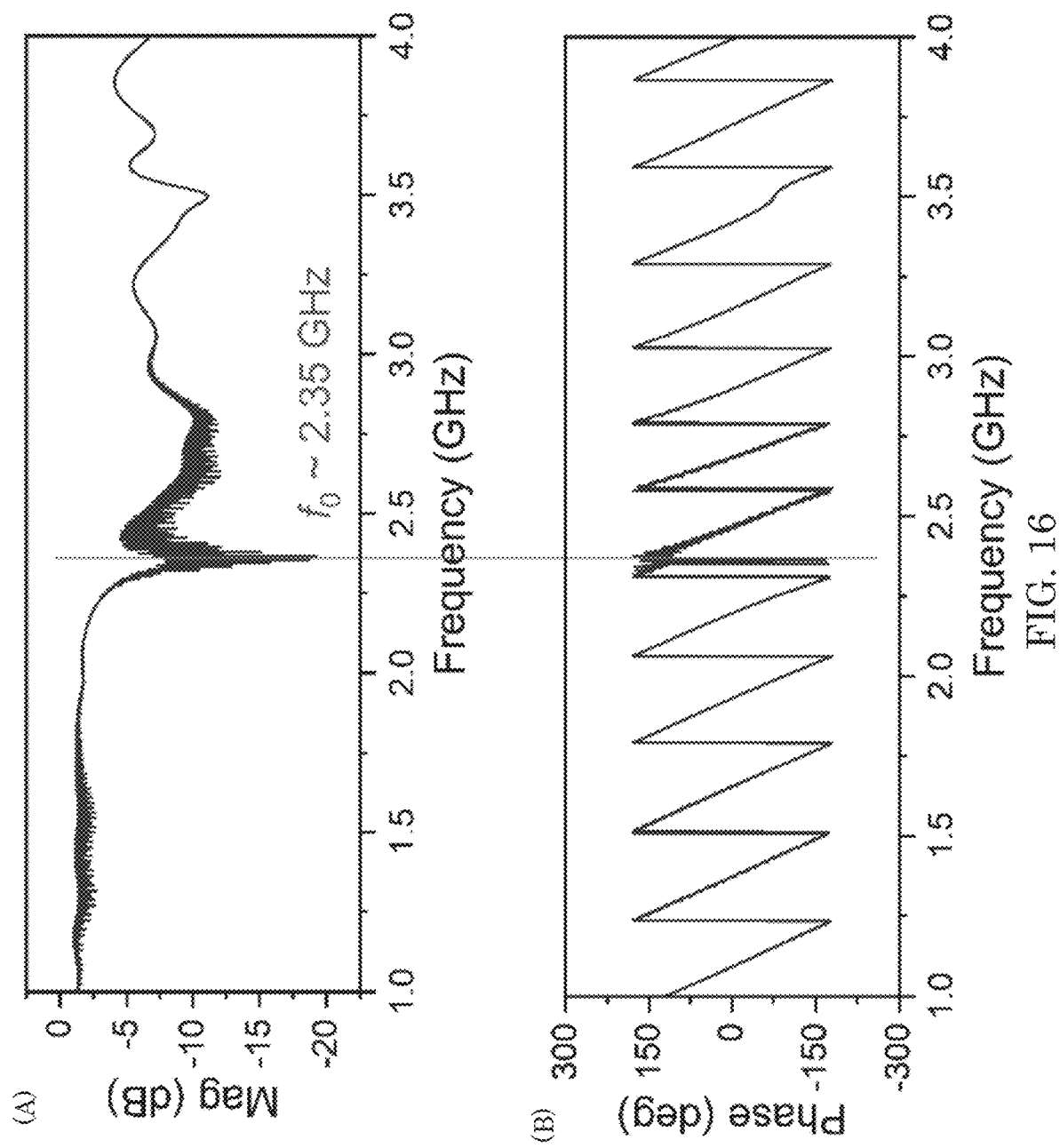
FIG. 16 shows electrical characterization of BAW. The magnitude and phase of the S11 parameter of BAW transducer from 1 GHz to 4 GHz.
Figure 17:
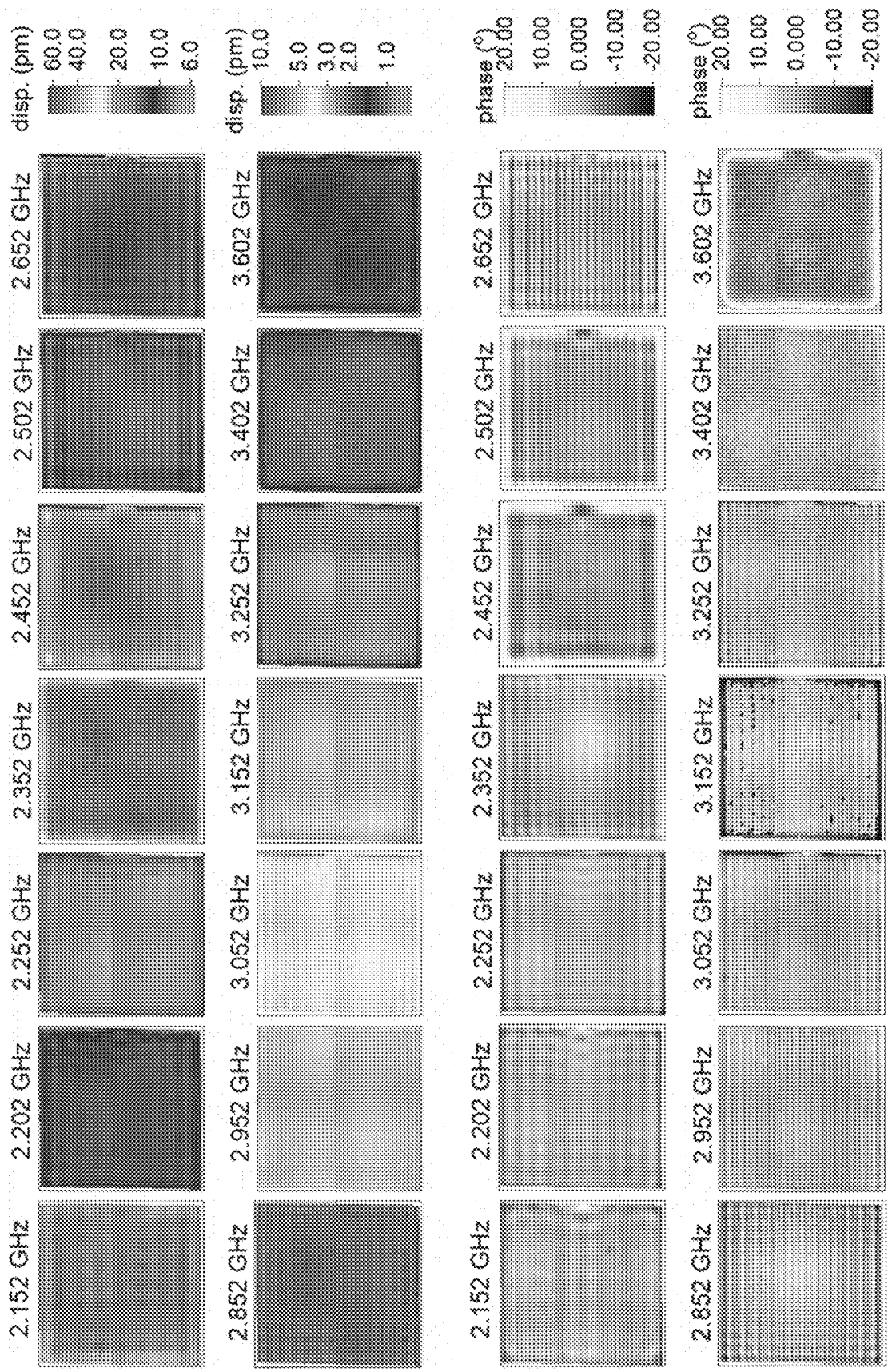
FIG. 17 shows vibration mapping of BAW transducers. The vibrational amplitude and phase were obtained by scanning the laser spot across BAW surface.

The electrical measurement of the BAW transducer was also carried out using a vector network analyzer (VNA). The BAW is mounted on a PCB with a SMA connector and the signal pads are wire bonded. The measurement was carried out at room temperature at ambient condition. The device is excited by applying +10 dBm AC input from a VNA to the two electrodes and an electrical readout of the S11 parameter is obtained, as shown in FIG. 16. A resonant mode at around 2.35 GHz was found based on the S11 plot. This resonant mode is consistent with the first thickness mode detected using the optical method presented in FIG. 8.

Spikes in the magnitude plot are due to multiple echoes of the acoustic waves reflected from the other side of the silicon chip. This could be removed by applying a time gating on the S11 measurement. A SOLT calibration involving short, open, load and transmission could be performed to improve the S11 signal. Due to the limit of VNA, we measure up to 4.5 GHz and do not observe the higher-order modes.

Comparing the electrical measurement with the frequency response we obtained using stroboscopic optical sampling, the optical measurement is much cleaner, showing a clear resonance at 2.35 GHz. With an optical method, one can get a better SNR and gain information for vibration mode shape and energy dissipation pattern with the spurious modes generated by super-positioned high-order lateral modes. This information would be difficult to obtain using a conventional electrical characterization. Furthermore, the resonant motion at higher-order modes may not show up in an electrical measurement, particularly for the mode at 10.75 GHz, due to the high-frequency feedthrough parasitics. Other optical methods, such as heterodyne laser vibrometer, would probably also miss the mode at 10.75 GHz as they suffer from the large noise due to high-frequency electromagnetic interference. Our method thus provides the unique advantage to reveal nanomechanical motions at frequencies beyond 10 GHz.

The vibrational mode profile for more frequencies across the first resonant peak of the BAW transducer includes the absolute displacement and the phase. The periodicity of the horizontal mode gradually decreases as frequency increases till the point, around 3.6 GHz, that the in-plane resolution of our instrument can no longer distinguish the small periodicity. The laser spot size in the current setup is about 1.9 μm, which can be easily reduced to 0.8 μm. Lateral modes in the frequency range approaching 10 GHz can be revealed. The effect of the electrical tracing as a pathway for vibrational energy leaking can also be observed particularly for frequencies at 2.452 GHz, 2.502 GHz, and 3.602 GHz.

Figure 18:
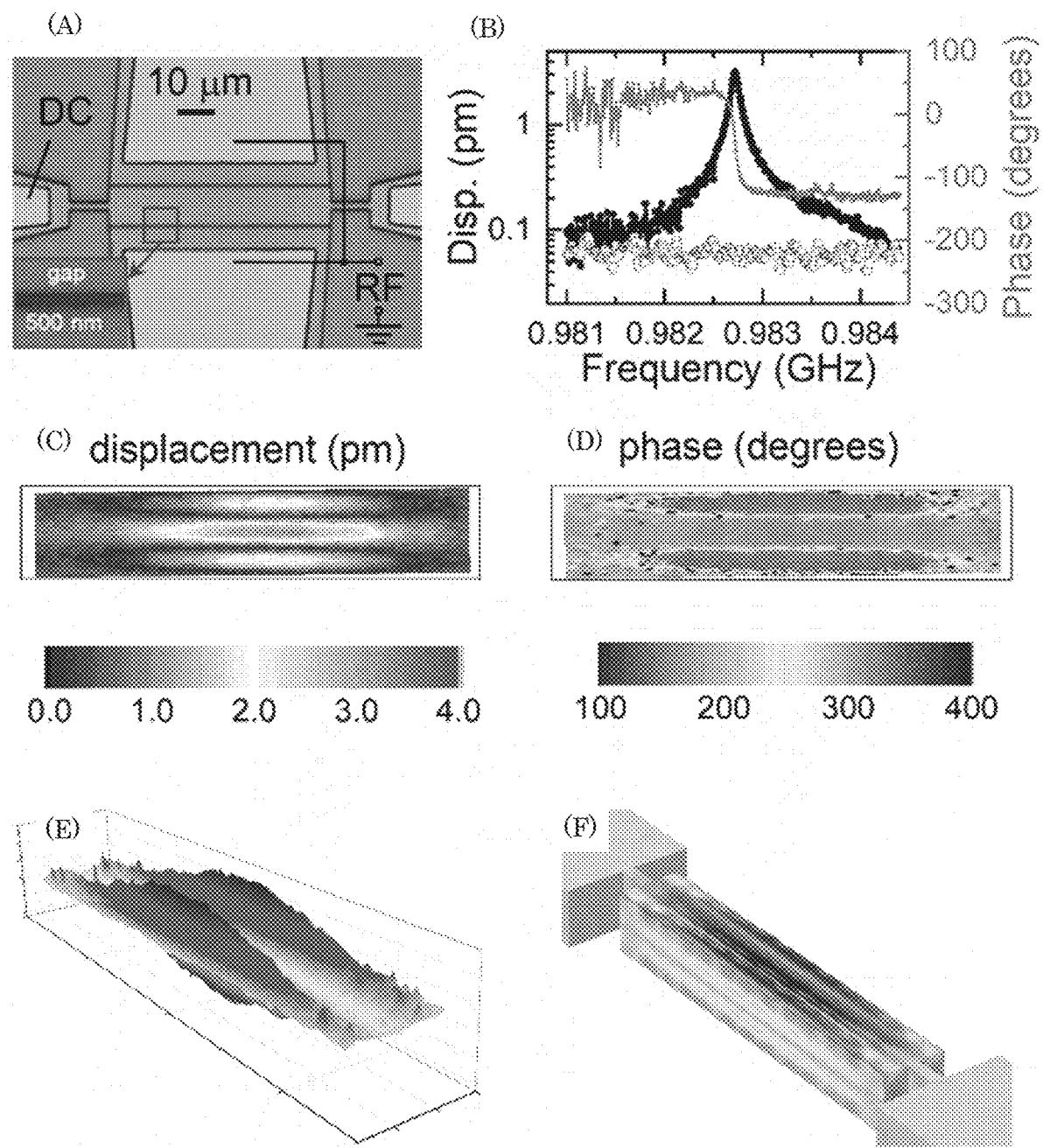
FIG. 18 shows imaging high-Q micromechanical vibrations near 1 GHz. (a) Microscopic photo of BAR under test with the schematic drawing of the applied DC and RF power. (b) Frequency response of the third width mode as the displacement amplitude and phase are shown in black and blue, respectively, for a DC bias at 20 V and RF at +10 dBm. The displacement amplitude is shown in hollow circles, for a DC bias at 20 V and RF disconnected. (c) and (d) Mapping BAR vertical vibration amplitude and phase at 0.9827 GHz. The dashed lines represent the outer dimensions of the BAR, 11.5 μm×65 μm. Combining amplitude and phase results in a 3D mapping of the mechanical resonance, as shown in (e). It matches with the resonant displacement calculated by finite-element computation for the third width-extensional mode shown in (f).

Another device that was measured with the pulsed laser interferometer is a width-extensional silicon BAR as shown in FIG. 18(a). It was fabricated on a silicon-on-insulator (SOI) wafer, which has a 10 μm+0.5 μm thick device layer of <100> silicon with a resistivity of 0.01-0.02 Ωcm, a 2 μm+0.5 μm thick buried oxide layer, and a 500 μm thick handle wafer. Bond pads consisting of 10 nm/200 nm Cr/Au layers deposited using electron-beam evaporation and a liftoff process. After metallization, a 380 nm thick SiO$_2$ hard mask layer is deposited using plasma enhanced chemical vapor deposition and patterned using optical lithography and reactive ion etching. The Si etch uses deep reactive ion etching with an optimized process that yields smooth sidewalls. The entire depth of the device layer is etched, monolithically defining the resonator, tethers, and anchors. The wafer is diced and resonators are released from the substrate by etching away the SiO$_2$ hard-mask and buried oxide using vapor-phase hydrofluoric acid etching. Finally, resonators are mounted on a chip carrier and signal pads are wire-bonded.

The BAR was actuated by electrostatic coupling across the 500 nm gaps between the two RF electrodes and the resonant body in the center that was contacted by a DC power. A lateral breathing mode along the width was thus excited and so as the weak out-of-plane motion by Poisson coupling. Because the resonant body was released and only consisting of silicon, its mechanical resonance features a high Q and narrow spectral linewidth. Thus, its frequency response was obtained by beating with only one tooth in the electrical frequency comb when sweeping the excitation frequency across the narrow resonance peak. The FIG. 18(b) shows the measured absolute amplitude and phase around the third width mode at 0.9827 GHz for an applied RF at +10 dBm and DC at 20 V, which was beating with the 19$^{th}$ tooth for a $f_p$ tuned at 51.5 MHz (i.e., 0.9785 GHz). The noise floor represented by the circles at about 55 μm also matches with that obtained using the BAW.

The laser spot was then scanned across the whole BAR surface at 0.9827 GHz, yielding mapping of the out-of-plane displacement and phase, which clearly shows the resonance of a third-order width-extensional mode. The phase transition along the width of the resonant body is nearly 180, as expected. Combining these two maps results in a reconstructed 3D motion of the mechanical resonance, as shown in FIG. 18(e), closely matching with the resonant displacement calculated by finite-element analysis shown in FIG. 18(f).

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A pulsed laser interferometer for measuring vibrational amplitude and vibrational phase of a structural member, the pulsed laser interferometer comprising:
a pulsed laser in optical communication with the structural member and that:
produces laser pulses, each laser pulses comprises a radiofrequency comb; and
subjects the structural member to the radiofrequency comb in the laser pulses;
a vibration controller in electrical communication with the structural member and that produces a vibration control signal that controls a vibrational frequency and vibrational amplitude of the structural member;
an interferometer controller that receives an interference frequency signal and produces an interferometer control signal based on the interference frequency signal;
a pathlength control stage in electrical communication with the interferometer controller and that receives the interferometer control signal from the interferometer controller and moves in a motion as controlled by the interferometer control signal to change an optical pathlength of propagation for the laser pulses in the pulsed laser interferometer;
a pathlength reflector disposed on the pathlength control stage and in optical communication with the pulsed laser and that:
receives the laser pulses from the laser; and
moves in concert with the pathlength control stage to change the optical pathlength of propagation for the laser pulses;
a light pulse detector in optical communication with the pulsed laser and that:
receives the laser pulses from the pulsed laser; and
produces a light pulse detector signal from the laser pulses;
an interference light detector in optical communication with the pathlength reflector and the structural member and that:
receives the laser pulses reflected from the structural member;
receives the laser pulses reflected from the pathlength reflector;
and produces an interference frequency signal from a beat frequency produced from interferences between the laser pulses reflected from the structural member and the laser pulses reflected from the pathlength reflector;
a signal mixer in electrical communication with the vibration controller and the light pulse detector and that:
receives the light pulse detector signal from the light pulse detector;
receives the vibration control signal from the vibration controller; and
produces a reference frequency signal from a combination of the vibration control signal and the light pulse detector signal; and
a phase-sensitive detector in electrical communication with the signal mixer and the light pulse detector and that:
receives the reference frequency signal from the signal mixer;
receives the interference frequency signal from the interference light detector;
references the interference frequency signal from the reference frequency signal; and
produces a vibrational amplitude signal and a vibrational phase signal from the interference frequency signal referenced to the reference frequency signal.

2. The pulsed laser interferometer of claim 1, further comprising a scanning stage that receives disposal of the structural member, wherein the scanning stage scans a portion of the structural member that is subjected to the laser pulses.

3. The pulsed laser interferometer of claim 1, further comprising a microscope in optical communication with the structural member for monitoring the structural member.

4. The pulsed laser interferometer of claim 1, wherein a wavelength of the laser pulses is from 400 nm to 1700 nm.

5. The pulsed laser interferometer of claim 1, wherein a frequency of teeth in the radiofrequency comb is from 1 MHz to 100 GHz.

6. The pulsed laser interferometer of claim 1, wherein the vibrational frequency of the structural member is from 1 MHz to 50 GHz.

7. The pulsed laser interferometer of claim 1, wherein a frequency of the interference frequency signal is from 1 kHz to 50 MHz.

8. A process for measuring vibrational amplitude and vibrational phase of a structural member with the pulsed laser interferometer of claim 1, the process comprising:
producing, by the pulsed laser, the laser pulses;
subjecting the structural member to the radiofrequency comb in the laser pulses;
producing, by the vibration controller, the vibration control signal;
controlling, by the vibration control signal, the vibrational frequency and the vibrational amplitude of the structural member;
receiving, by the interferometer controller, the interference frequency signal;
producing, by the interferometer controller, the interferometer control signal based on the interference frequency signal;
receiving, by the pathlength control stage, the interferometer control signal from the interferometer controller;
moving the pathlength control stage in the motion controlled by the interferometer control signal;
changing, by the pathlength control stage, the optical pathlength of propagation for the laser pulses in the pulsed laser interferometer;
receiving, by the pathlength reflector, the laser pulses from the pulsed laser,
moving the pathlength reflector in concert with the pathlength control stage to change the optical pathlength of propagation for the laser pulses;
receiving, by the light pulse detector, the laser pulses from the pulsed laser;
producing, by the light pulse detector, the light pulse detector signal from the laser pulses;
receiving, by the interference light detector, the laser pulses reflected from the structural member and the laser pulses reflected from the pathlength reflector;
producing, by the interference light detector, the interference frequency signal from the beat frequency produced from interference between the laser pulses reflected from the structural member and the laser pulses reflected from the pathlength reflector, receiving, by the signal mixer, the light pulse detector signal from the light pulse detector;

receiving, by the signal mixer, the vibration control signal from the vibration controller;

producing, by the signal mixer, the reference frequency signal from the combination of the vibration control signal and the light pulse detector signal;

receiving, by the phase-sensitive detector, the reference frequency signal from the signal mixer;

receiving, by the phase-sensitive detector, the interference frequency signal from the interference light detector;

referencing, by the phase-sensitive detector, the interference frequency signal from the reference frequency signal; and producing, by the phase-sensitive detector, the vibrational amplitude signal and the vibrational phase signal from the interference frequency signal referenced to the reference frequency signal.

9. The process of claim 8, further comprising changing a portion of the structural member that is subjected to the laser pulses by moving the structural member with the scanning stage.

10. The pulsed laser interferometer of claim 8, further comprising monitoring the structural member with a microscope.

11. The pulsed laser interferometer of claim 8, wherein a wavelength of the laser pulses is from 400 nm to 1700 nm.

12. The pulsed laser interferometer of claim 8, wherein a frequency of teeth in the radiofrequency comb is from 1 MHz to 100 GHz.

13. The pulsed laser interferometer of claim 8, wherein the vibrational frequency of the structural member is from 1 MHz to 50 GHz.

14. The pulsed laser interferometer of claim 8, wherein a frequency of the interference frequency signal is 1 kHz to 50 MHz.

\* \* \* \* \*